US012660008B2

(12) United States Patent
Lee et al.

(10) Patent No.: US 12,660,008 B2
(45) Date of Patent: Jun. 16, 2026

(54) METHOD AND APPARATUS FOR WIRELESS CONNECTION BETWEEN ELECTRONIC DEVICES

(71) Applicant: SAMSUNG ELECTRONICS CO., LTD., Suwon-si (KR)

(72) Inventors: Jaehyeok Lee, Suwon-si (KR); Taikuin Mun, Suwon-si (KR); Jaehoon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 459 days.

(21) Appl. No.: 17/966,446

(22) Filed: Oct. 14, 2022

(65) Prior Publication Data

US 2023/0032366 A1 Feb. 2, 2023

Related U.S. Application Data

(63) Continuation of application No. PCT/KR2021/003362, filed on Mar. 18, 2021.

(30) Foreign Application Priority Data

Apr. 14, 2020 (KR) ........................ 10-2020-0045157

(51) Int. Cl.
*H04W 76/10* (2018.01)
*H04W 4/024* (2018.01)
(Continued)

(52) U.S. Cl.
CPC ........... *H04W 76/10* (2018.02); *H04W 4/024* (2018.02); *H04W 8/005* (2013.01); *H04W 12/06* (2013.01);
(Continued)

(58) Field of Classification Search
CPC ....... H04W 4/024; H04W 8/00; H04W 8/005; H04W 12/06; H04W 12/50; H04W 12/63;
(Continued)

(56) References Cited

U.S. PATENT DOCUMENTS

| | | | | |
|---|---|---|---|---|
| 8,698,597 B2 * | 4/2014 | Kassiedass | ........... | H04L 9/0866 340/5.74 |
| 8,965,285 B2 * | 2/2015 | Palin | ................... | H04W 56/002 455/161.3 |

(Continued)

FOREIGN PATENT DOCUMENTS

| | | |
|---|---|---|
| JP | 2018-42061 A | 3/2018 |
| KR | 10-2016-0129635 A | 11/2016 |

(Continued)

OTHER PUBLICATIONS

Tait, Matthew. "Smart Wallet." InnovationQTM Powered by Ip.com Prior Art Database, Sep. 10, 2018, priorart.ip.com/IPCOM/000255203. (Year: 2018).*

(Continued)

*Primary Examiner* — Nishant Divecha
*Assistant Examiner* — Caleb James Ballowe
(74) *Attorney, Agent, or Firm* — Sughrue Mion, PLLC

(57) ABSTRACT

A method and an apparatus for supporting a wireless connection between an electronic device and an external device are provided. An electronic device includes a microphone; a wireless communication circuit; a display; a memory configured to store instructions; and a processor operatively connected to the microphone, the wireless communication circuit, the display, and the memory, where the processor is configured to execute the instructions to: detect a trigger for a wireless connection to an external device; based on the detection of the trigger, search for the external device by using the wireless communication circuit; control the dis-
(Continued)

play to display a guide related to proximity between the electronic device and the external device; and based on detecting that the electronic device and the external device are within a designated range from each other, acquire an external signal through the microphone by performing a designated operation with the external device.

14 Claims, 19 Drawing Sheets

(51) Int. Cl.
| | |
|---|---|
| *H04W 8/00* | (2009.01) |
| *H04W 12/06* | (2021.01) |
| *H04W 12/50* | (2021.01) |
| *H04W 12/63* | (2021.01) |
| *H04W 48/16* | (2009.01) |
| *H04W 64/00* | (2009.01) |

(52) U.S. Cl.
CPC ........... *H04W 12/50* (2021.01); *H04W 12/63* (2021.01); *H04W 48/16* (2013.01); *H04W 64/003* (2013.01)

(58) Field of Classification Search
CPC .............. H04W 48/16; H04W 64/003; H04W 76/10; H04W 76/14; H04B 11/00
See application file for complete search history.

(56) References Cited

U.S. PATENT DOCUMENTS

| | | | | |
|---|---|---|---|---|
| 9,706,357 | B2 * | 7/2017 | Heo ....................... | H04W 4/027 |
| 9,967,746 | B2 * | 5/2018 | Na ......................... | H04W 76/14 |
| 10,042,595 | B2 * | 8/2018 | Behzadi ................... | G06F 3/14 |
| 10,152,285 | B2 | 12/2018 | Chang et al. | |
| 10,349,171 | B2 | 7/2019 | Yoon et al. | |
| 10,558,427 | B2 | 2/2020 | Jo et al. | |
| 10,623,885 | B2 | 4/2020 | Heo et al. | |
| 11,522,619 | B2 * | 12/2022 | Shoop ................ | H04B 7/15521 |
| 2012/0289157 | A1 | 11/2012 | Palin et al. | |
| 2013/0225128 | A1 * | 8/2013 | Gomar ................ | H04L 63/0861 |
| | | | | 455/411 |
| 2013/0262873 | A1 * | 10/2013 | Read ................... | H04L 63/0861 |
| | | | | 713/186 |
| 2014/0012587 | A1 * | 1/2014 | Park ...................... | H04W 12/50 |
| | | | | 704/275 |
| 2015/0318874 | A1 * | 11/2015 | Donaldson ............... | H04B 1/00 |
| | | | | 367/135 |
| 2016/0150582 | A1 * | 5/2016 | Jung ..................... | H04W 12/50 |
| | | | | 455/41.1 |
| 2016/0323863 | A1 * | 11/2016 | Park ........................ | H04W 4/70 |
| 2018/0053176 | A1 * | 2/2018 | Rawat .................... | G06Q 20/40 |
| 2018/0368193 | A1 | 12/2018 | Alipour et al. | |
| 2019/0052999 | A1 * | 2/2019 | Lee ........................ | H04W 76/14 |
| 2019/0182176 | A1 * | 6/2019 | Niewczas ............... | G10L 17/24 |
| 2019/0334782 | A1 * | 10/2019 | Dellinger .......... | H04W 52/0267 |
| 2020/0036569 | A1 | 1/2020 | Mekenkamp | |

FOREIGN PATENT DOCUMENTS

| | | | |
|---|---|---|---|
| KR | 10-2016-0144919 A | 12/2016 | |
| KR | 10-2017-0001173 A | 1/2017 | |
| KR | 10-2019-0013062 A | 2/2019 | |
| KR | 10-2019-0022883 A | 3/2019 | |

OTHER PUBLICATIONS

S. Bajpai and D. Radha, "Smart Phone as a Controlling Device for Smart Home using Speech Recognition" 2019 International Conference on Communication and Signal Processing (ICCSP), Chennai, India, 2019, pp. 0701-0705, doi: 10.1109/ICCSP.2019. 8697923. (Year: 2019).*

Wang, Chen, Cong Shi, Yingying Chen, Yan Wang, and Nitesh Saxena. "WearID: Wearable-assisted low-effort authentication to voice assistants using cross-domain speech similarity." arXiv preprint arXiv:2003.09083 (2020). (Year: 2020).*

International Search Report (PCT/ISA/210) issued Jun. 24, 2021 by the International Searching Authority in International Application No. PCT/KR2021/003362.

Written Opinion (PCT/ISA/237) issued Jun. 24, 2021 by the International Searching Authority in International Application No. PCT/KR2021/003362.

Office Action issued Oct. 24, 2025 by the Korean Ministry of Intellectual Property in Korean Patent Application No. 10-2020-0045157.

* cited by examiner

Figure 14:
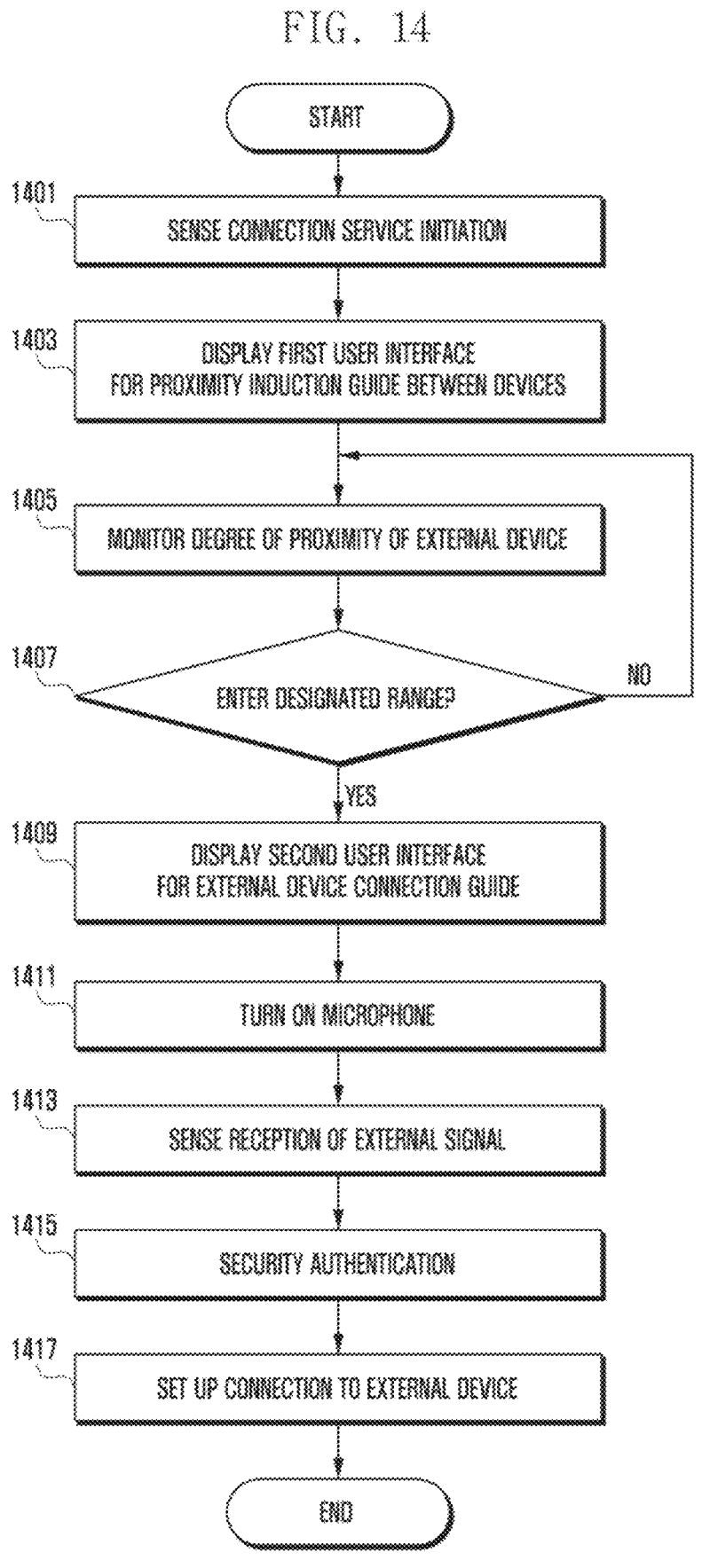

```
                    ┌──────────────┐
                    │    START     │
                    └──────┬───────┘
                           ↓
1401        ┌──────────────────────────────────────┐
            │     SENSE CONNECTION SERVICE INITIATION │
            └──────────────────┬───────────────────┘
                               ↓
1403        ┌──────────────────────────────────────┐
            │         DISPLAY FIRST USER INTERFACE    │
            │ FOR PROXIMITY INDUCTION GUIDE BETWEEN DEVICES │
            └──────────────────┬───────────────────┘
                               ↓
1405        ┌──────────────────────────────────────┐
            │ MONITOR DEGREE OF PROXIMITY OF EXTERNAL DEVICE │
            └──────────────────┬───────────────────┘
                               ↓
1407                  ╱────────────────╲          NO
                     ╱  ENTER DESIGNATED  ╲────────┐
                     ╲      RANGE?        ╱        │
                      ╲────────┬─────────╱         │
                           YES │                   │
                               ↓                   │
1409        ┌──────────────────────────────────────┐
            │       DISPLAY SECOND USER INTERFACE     │
            │    FOR EXTERNAL DEVICE CONNECTION GUIDE │
            └──────────────────┬───────────────────┘
                               ↓
1411        ┌──────────────────────────────────────┐
            │            TURN ON MICROPHONE           │
            └──────────────────┬───────────────────┘
                               ↓
1413        ┌──────────────────────────────────────┐
            │       SENSE RECEPTION OF EXTERNAL SIGNAL │
            └──────────────────┬───────────────────┘
                               ↓
1415        ┌──────────────────────────────────────┐
            │           SECURITY AUTHENTICATION       │
            └──────────────────┬───────────────────┘
                               ↓
1417        ┌──────────────────────────────────────┐
            │      SET UP CONNECTION TO EXTERNAL DEVICE │
            └──────────────────┬───────────────────┘
                               ↓
                    ┌──────────────┐
                    │     END      │
                    └──────────────┘
```

FIG. 18

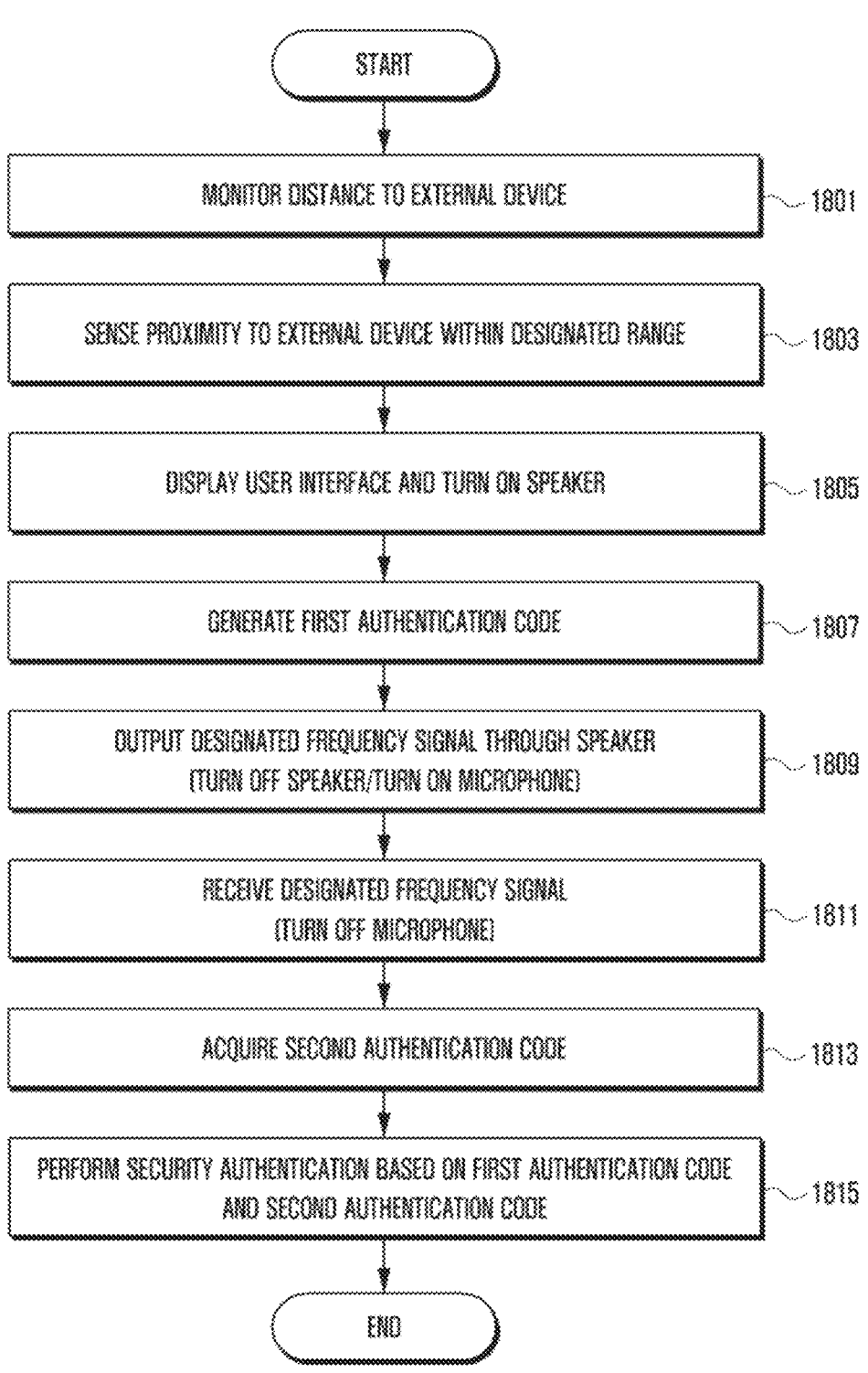

START

MONITOR DISTANCE TO EXTERNAL DEVICE ~ 1801

SENSE PROXIMITY TO EXTERNAL DEVICE WITHIN DESIGNATED RANGE ~ 1803

DISPLAY USER INTERFACE AND TURN ON SPEAKER ~ 1805

GENERATE FIRST AUTHENTICATION CODE ~ 1807

OUTPUT DESIGNATED FREQUENCY SIGNAL THROUGH SPEAKER
(TURN OFF SPEAKER/TURN ON MICROPHONE) ~ 1809

RECEIVE DESIGNATED FREQUENCY SIGNAL
(TURN OFF MICROPHONE) ~ 1811

ACQUIRE SECOND AUTHENTICATION CODE ~ 1813

PERFORM SECURITY AUTHENTICATION BASED ON FIRST AUTHENTICATION CODE
AND SECOND AUTHENTICATION CODE ~ 1815

END

METHOD AND APPARATUS FOR WIRELESS CONNECTION BETWEEN ELECTRONIC DEVICES

CROSS-REFERENCE TO RELATED APPLICATIONS

This application is a by-pass continuation application of International Application No. PCT/KR2021/003362, filed Mar. 18, 2021, which is based on and claims priority to Korean Patent Application No. 10-2020-0045157, filed on Apr. 14, 2020, in the Korean Intellectual Property Office, the disclosures of which is incorporated by reference herein in their entireties.

BACKGROUND

1. Field

The disclosure relates to a method and an apparatus for supporting a wireless connection between an electronic device of the disclosure and an external device.

2. Description of Related Art

With the recent development of digital technology, various types of electronic devices such as a mobile communication terminal, a smartphone, a tablet, a personal computer (PC), a notebook, or a wearable device are widely used. In order to support and increase functions of the electronic devices, hardware parts and/or software parts of the electronic devices are continuously being researched and developed.

An electronic device may transmit or receive data through a wireless (e.g., Bluetooth communication) connection (e.g., pairing) with an external device. For example, in Bluetooth communication, a device that requests and manages a connection is called a master, and a device that accepts a connection request from the master and conforms to the master's connection management is called a slave.

According to a pairing method for performing mutual interworking and operation in electronic devices in the related art, when an electronic device scans nearby external devices based on a user's menu manipulation and provides the user with approximate information (e.g., device names and device identification information) related to the multiple scanned external devices in the form of a list, the user predicts and selects a target device based on the approximate information in the list. For example, the user searches for nearby devices by using the electronic device, selects a device, to which the electronic device is to be connected, from a list of the found devices, and performs user confirmation based on a designated authentication method with the selected device, and then may connect the electronic device to the selected device.

A related art method for a wireless connection between an electronic device and an external device may cause inconvenience in a user's connection manipulation, may not provide the user with intuitiveness of a target device, and may select an uncertain connection target.

SUMMARY

Provided are a method and an apparatus that may allow a user to more intuitively specify an external device and wirelessly connect an electronic device to the corresponding external device.

Further, provided are a method and an apparatus that may provide, during a wireless connection between an electronic device and an external device, authentication between the devices by using sound wave data.

Further still, provided are a method and an apparatus that may support, when making a wireless connection between an electronic device and an external device, a simpler and more intuitive connection between the devices by using a user's voice and/or a designated frequency signal.

According to an aspect of the disclosure, an electronic device includes: a microphone; a wireless communication circuit; a display; a memory configured to store instructions; and a processor operatively connected to the microphone, the wireless communication circuit, the display, and the memory, wherein the processor is configured to execute the instructions to: detect a trigger for a wireless connection to an external device; based on the detection of the trigger, search for the external device by using the wireless communication circuit; control the display to display a guide related to proximity between the electronic device and the external device; based on detecting that the electronic device and the external device are within a designated range from each other, acquire an external signal through the microphone by performing a designated operation with the external device; perform authentication for the wireless connection to the external device, based on the acquired external signal; and based on a result of the authentication, configure the wireless connection to the external device via the wireless communication circuit.

The processor may be further configured to execute the instructions to: based on the detection of the trigger, control the display to display a first user interface related to proximity between devices; and control the wireless communication circuit to transmit a service initiation request which instructs the external device to execute the designated operation, wherein the designated operation includes turning on a microphone of the external device, and the service initiation request includes at least one address information of the electronic device, service initiation information, and external signal reception standby indication information.

The processor may be further configured to execute the instructions to: monitor a degree of proximity to the external device by using the wireless communication circuit; and identify that the external device and the electronic device are within the designated range from each other based on a result of the monitoring indicating that signal reception sensitivity of the electronic device and the external device reaches a designated threshold.

The processor may be further configured to execute the instructions to: based on detecting that the electronic device and the external device are within the designated range from each other, control the display to display a second user interface related to a user audio input; control a microphone related to the designated operation to be activated with the displaying of the second user interface; and receive an audio signal input through the microphone.

The processor may be further configured to execute the instructions to: acquire first authentication data based on the audio signal; acquire, from the external device, second authentication data acquired based on the audio signal; and perform the authentication for the wireless connection between the electronic device and the external device, based on data consistency between the first authentication data and the second authentication data.

The electronic device may include a speaker, and the processor may be further configured to execute the instructions to output a first designated frequency signal to the external device through the speaker, based on detecting that the electronic device and the external device are within the designated range from each other.

The processor may be further configured to execute the instructions to: based on detecting that the electronic device and the external device are within the designated range from each other, control the display to display a third user interface indicating that authentication is being performed with the external device; control a speaker related to the designated operation to be activated with the displaying of the third user interface; encode a first authentication code in the first designated frequency signal and output the first designated frequency signal to the external device through the speaker; acquire a second designated frequency signal from the external device through the microphone, the second designated frequency signal including a second authentication code acquired based on the first designated frequency signal; and perform the authentication for the wireless connection between the electronic device and the external device, based on data consistency between the first authentication code and the second authentication code.

The external signal may include at least one of a user voice signal and a frequency signal using a speaker.

The processor may be further configured execute the instructions to: based on the detection of the trigger, search for nearby candidate external devices by using the wireless communication circuit; control the display to display objects related to the electronic device and the found candidate external devices through the first user interface; control the display to display distinguishably the candidate external devices in the first user interface, based on signal reception sensitivity of the found candidate external devices; determine a nearest candidate external device, among the candidate external devices, to be a target external device to be connected; and control the display to display objects related to the electronic device and the target external device in the first user interface, based on the determination of the target external device.

According to an aspect of the disclosure, an operation method of an electronic device, includes: detecting a trigger for a wireless connection to an external device; based on the detecting of the trigger, searching for the external device by using a wireless communication circuit; displaying, through a display, a guide related to proximity between the electronic device and the external device; based on detecting that the electronic device and the external device are within a designated range from each other, acquiring an external signal through a microphone by performing a designated operation with the external device; performing authentication for the wireless connection to the external device, based on the acquired external signal; and based on a result of the authentication, configuring the wireless connection to the external device by using the wireless communication circuit.

The displaying the guide may include: based on the detecting of the trigger, displaying a first user interface related to proximity between devices; and transmitting, by using the wireless communication circuit, a service initiation request which instructs the external device to execute the designated operation, the designated operation may include activating on a microphone of the external device, and the service initiation request may include at least one of address information of the electronic device, service initiation information, and external signal reception standby indication information.

The method may further include: monitoring a degree of proximity to the external device by using the wireless communication circuit; and identifying that the external device and the electronic device are within the designated range from each other based on a result of the monitoring indicating that signal reception sensitivity of the electronic device and the external device reaches a designated threshold.

The designated operation may include: displaying a second user interface related to a user audio input, based on detecting that the electronic device and the external device are within the designated range from each other; controlling a microphone related to the designated operation to be activated with the displaying of the second user interface; and receiving an audio signal externally through the microphone.

The performing of the authentication may include: acquiring first authentication data based on the audio signal; acquiring, from the external device, second authentication data acquired based on the audio signal; and performing the authentication for the wireless connection between the electronic device and the external device, based on data consistency between the first authentication data and the second authentication data.

The performing of the authentication may include: based on detecting that the electronic device and the external device are within the designated range from each other, displaying a third user interface indicating that authentication is being performed with the external device; controlling a speaker related to the designated operation to be turned on with the displaying of the third user interface; encoding a first authentication code in a first designated frequency signal and outputting the first designated frequency signal to the external device through the speaker; acquiring a second designated frequency signal from the external device through the microphone, the second designated frequency signal including a second authentication code acquired based on the first designated frequency signal; and performing the authentication for the wireless connection between the electronic device and the external device, based on data consistency between the first authentication code and the second authentication code.

An electronic device and an operation method thereof, according to one or more embodiments, may allow a user to intuitively specify a desired external device when making a wireless connection between the electronic device and the external device, thereby providing intuitiveness of a device to be connected. According to one or more embodiments, at the time of a wireless connection between the electronic device and an external device, sound wave data may be used to provide authentication between the devices, thereby providing convenience in the user's wireless connection while enhancing security. According to one or more embodiments, when making a wireless connection between the electronic device and the external device, a simpler and more intuitive connection between the devices may be supported by using a user's voice and/or a designated frequency signal.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 1 illustrates an electronic device in a network environment according to an embodiment;

FIG. 14 is a flowchart illustrating an operation method of an electronic device according to various embodiments;

FIG. 18 is a flowchart illustrating an operation method of an electronic device according to various embodiments.

DETAILED DESCRIPTION

Figure 1:
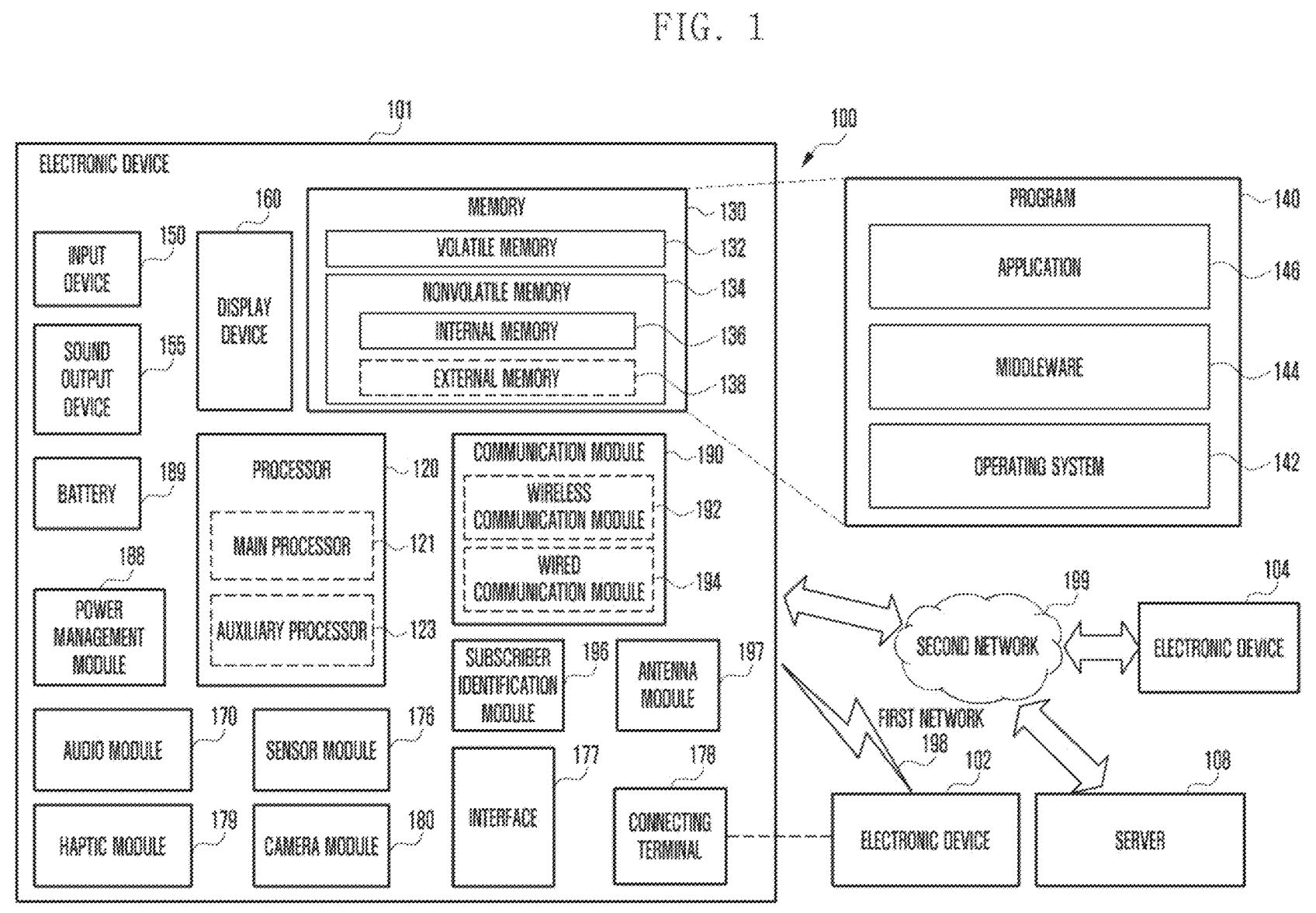
Figure 2:
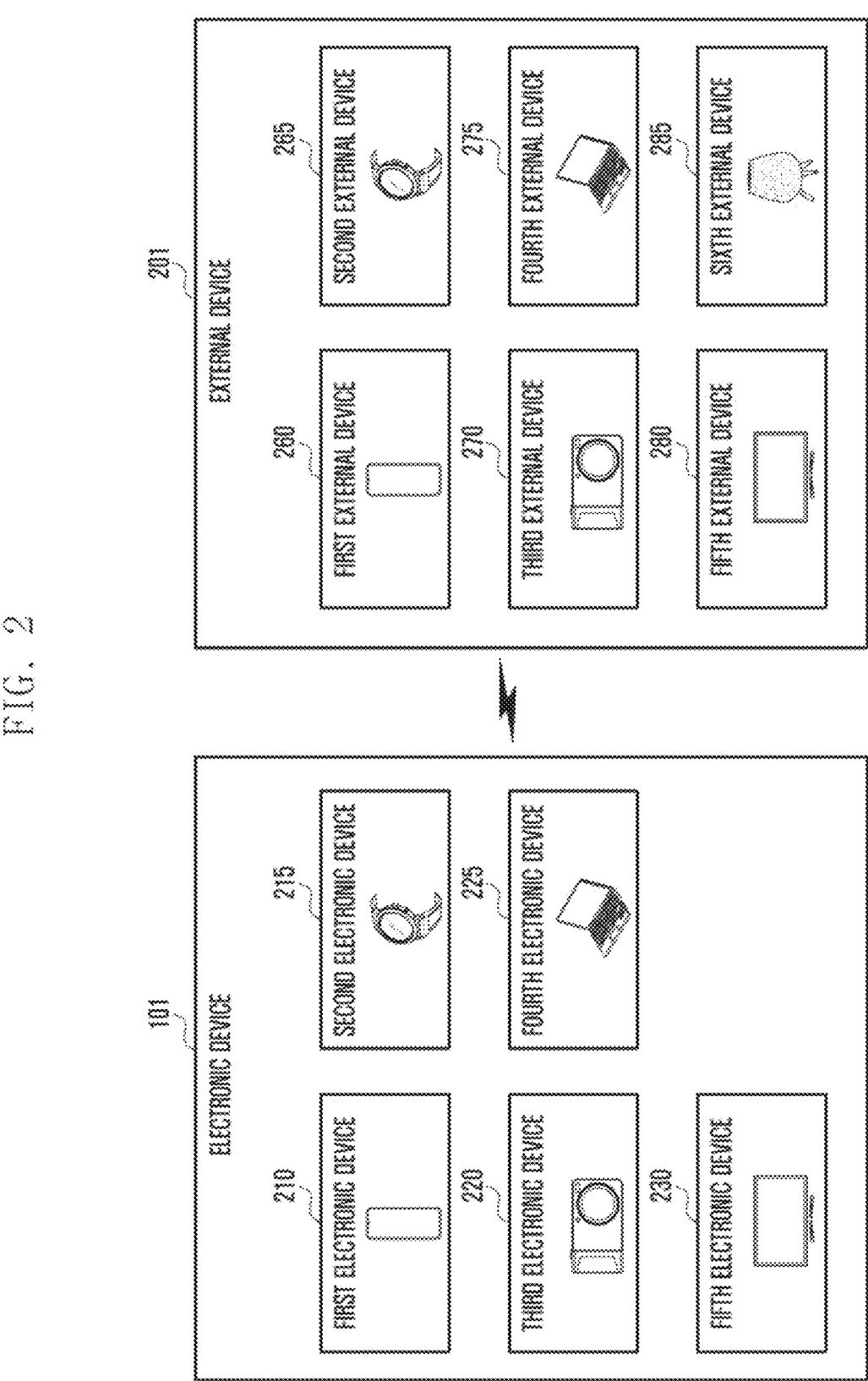
FIG. 2 illustrates an example in which an electronic device according to various embodiments is wirelessly connected to an external device.

FIG. 1 illustrates an electronic device 101 in a network environment 100 according to an embodiment.

Referring to FIG. 1, the electronic device 101 in the network environment 100 may communicate with an electronic device 102 via a first network 198 (e.g., a short-range wireless communication network), with an electronic device 104 or a server 108 via a second network 199 (e.g., a long-range wireless communication network), or with the electronic device 104 via the server 108, and may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) card 196, and an antenna module 197. At least one (e.g., the display device 160 or the camera module 180) of the components may be omitted from the electronic device 101, or one or more other components may be added in the electronic device 101. Some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. The processor 120 may load a command or data received from another component (e.g., the sensor module 176 or the communication module 190) in the volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101 and may include software (e.g., the program 140) and input data or output data for a command related thereto. The memory 130 may include the volatile memory 132 or the non-volatile memory 134.

The program 140 may be stored in the memory 130 as software, and may include an operating system (OS) 142, middleware 144, or an application 146.

The input device 150 may receive a command or data to be used by another component (e.g., the processor 120) of the electronic device 101, from the outside (e.g., a user) of the electronic device 101, and may include a microphone, a mouse, a keyboard, or a digital pen (e.g., a stylus pen).

The sound output device 155 may output sound signals to the outside of the electronic device 101 and may include a speaker or a receiver. The speaker may be used for general purposes, such as playing multimedia or playing record, and the receiver may be used for incoming calls and may be implemented as separate from, or as part of the speaker.

The display device 160 may visually provide information to the outside (e.g., a user) of the electronic device 101 and may include a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa, and may obtain the sound via the input device 150, or output the sound via the sound output device 155 or a headphone of an external electronic device (e.g., an electronic device 102) directly (e.g., over wires) or wirelessly coupled with the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state, and may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., over wires) or wirelessly, and may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102), and may include a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation, and may include a motor, a piezoelectric element, or an electric stimulator.

The camera module 180 may capture a still image or moving images and may include one or more lenses, image sensors, image signal processors, or flashes.

The power management module 188 may manage power supplied to the electronic device 101, and may be implemented as at least part of a power management integrated circuit (PMIC).

The battery 189 may supply power to at least one component of the electronic device 101, and may include a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., a LAN or a wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module card 196.

The antenna module 197 may transmit or receive a signal or power to or from the outside (e.g., the external electronic device) of the electronic device 101 and may include an antenna including a radiating element composed of a conductive material or a conductive pattern formed in or on a substrate (e.g., a PCB). The antenna module 197 may include a plurality of antennas. In such a case, at least one antenna appropriate for a communication scheme used in the communication network, such as the first network 198 or the second network 199, may be selected by the communication module 190 (e.g., the wireless communication module 192) from the plurality of antennas. The signal or the power may then be transmitted or received between the communication module 190 and the external electronic device via the selected at least one antenna. Another component (e.g., an RFIC) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101.

All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing, as at least part of a reply to the request. To that end, a cloud, distributed, or client-server computing technology may be used, for example.

The electronic device 101 according to embodiments may be one of various types of electronic devices, such as a portable communication device (e.g., a smartphone), a computer device, a portable multimedia device, a portable medical device, a camera, a wearable device, or a home appliance. However, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., over wires), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 2 illustrates an example in which an electronic device according to various embodiments is wirelessly connected to an external device.

Referring to FIG. 2, a user may use the electronic device 101 to connect designated wireless communication (e.g., Bluetooth communication or Wi-Fi communication) with another surrounding electronic device 260, 265, 270, 275, 280, or 285 (hereinafter, referred to as "external device 201") (e.g., pairing). According to an embodiment, the electronic device 101 may include various devices, such as a first electronic device 210 (e.g., a smartphone), a second electronic device 215 (e.g., a wearable device), a third electronic device 220 (e.g., a digital camera or a smart camera), a fourth electronic device 225 (e.g., a notebook), and/or a fifth electronic device 230 (e.g., TV or a display device), capable of identifying an external device 201 and capable of being wirelessly connected to the external device 201. According to an embodiment, the external device 201 may include various devices, such as a first external device 260 (e.g., a smartphone), a second external device 265 (e.g., a wearable device), a third external device 270 (e.g., a digital camera or a smart camera), a fourth external device 275 (e.g., a notebook), a fifth external device 280 (e.g., TV or a display device), and/or a sixth external device 285 (e.g., an audio device (e.g., an external speaker or an artificial intelligent (AI) speaker)), capable of being wirelessly connected to the electronic device 101.

According to an embodiment, the electronic device 101 may identify the external device 201 and perform wireless connection (e.g., pairing) with the identified external device 201. In an embodiment, identifying the external device 201 may be determining whether there is the external device 201 that transmits a response corresponding to a request from the electronic device 101. According to an embodiment, making a connection between the electronic device 101 and the external device 201 may imply, for example, that the electronic device 101 and the external device 201 are wirelessly connected to each other, or that the electronic device 101 or the external device 201 performs configuration for wirelessly transmitting and receiving data.

According to an embodiment, the electronic device 101 may identify the type of the external device 201 based on identification information (e.g., device ID and/or address Information) of the external device 201, acquired through a value carried in an advertising packet in an advertising operation before a connection to the external device 201. For example, the electronic device 101 may acquire identification information based on an advertising response (or a response message) of the external device 201, and may distinguish, based on the identification information related to the external device 201, the type of the external device 201 (e.g., a smartphone, a wearable device, a camera, a notebook, TV, a display device, and/or an audio device).

According to an embodiment, the electronic device 101 may simplify an operation for a wireless connection compared to the wireless connection method of the related art. For example, even when the electronic device 101 does not pre-register various types of information (e.g., identification information and authentication information) about the external device 201 to be connected, the electronic device 101 may easily specify the external device 201 to be connected, and may provide an easy connection with the external device 201 while maintaining security.

According to various embodiments, the electronic device 101 and the external device 201 may perform a connection therebetween by using voice-based device authentication when being connected to each other for the first time. According to an embodiment, in the prior art, at the time of a wireless connection (e.g., Bluetooth connection) between devices, a target device may be found and connected according to a given manual in a state in which a user does not understand a wireless connection target device (e.g., the external device 201), and the connection may be performed through a confirmation (e.g., pin number input) operation based on the user's manual input in both devices.

According to various embodiments, the electronic device 101 and/or the external device 201 may search for candidate devices based on detecting of a trigger related to a wireless connection, and may identify a target device by identifying a designated priority among the found candidate devices. In an embodiment, the trigger may include, for example, being worn on a user's body of the electronic device 101 and/or the external device 201, executing an application related to a wireless connection configuration (setup), and/or a user input (e.g., a touch, a gesture, an air gesture, and/or a voice command). In an embodiment, the designated priority may include a criterion for determining a connection target device. For example, the priority may be determined based on signal reception sensitivity (e.g., a received signal strength indicator (RSSI)) between the electronic device 101 and the external device 201.

According to an embodiment, when the electronic device 101 identifies the external device 201 as a target device, the electronic device 101 may make (or establish) a wireless connection to the external device 201 (connection establishment) (e.g., perform an operation before substantial connection (e.g., pairing)), and in a state in which the wireless connection is established (e.g., a state in which a wireless link before pairing is established), may provide a guide (e.g., a first guide or a proximity induction guide) for inducing (or instructing) the electronic device 101 and the external device 201 to be moved so as to be in proximity to each other within a designated distance range. In an embodiment, the designated distance range may indicate a degree to which the electronic device 101 and the external device 201 are in proximity to each other, and may include, for example, a distance at which the electronic device 101 and the external device 201 are capable of receiving (or inputting) the user's voice substantially (almost) simultaneously. In an embodiment, for example, the guide for inducing proximity within the designated distance range may be provided visually (e.g., a user interface or GUI) through a display (e.g., the display device 160 in FIG. 1), may be provided acoustically (e.g., sound or voice) through an output device (e.g., the sound output device 155 in FIG. 1), and/or may be provided tactilely (e.g., vibration) through a haptic module (e.g., the haptic module 179 in FIG. 1). An operation of providing a guide, according to an embodiment, will be described in detail with reference to the drawings that will be described later.

According to an embodiment, the electronic device 101 and/or the external device 201 may detect entering the designated distance range therebetween, and may turn on (or activate) a microphone (e.g., the input device 150 in FIG. 1)

based on the entry into the designated distance range. According to an embodiment, one of the electronic device 101 or the external device 201 may turn on a speaker (e.g., the sound output device 155 in FIG. 1), and the other device may turn on a microphone (e.g., the input device 150 in FIG. 1). For example, the former case (e.g., both devices turn on microphones) may be an example of an operation to perform a connection based on a user's voice. In another example, the latter case (e.g., one device turns on the speaker, and the other device turns on the microphone) may be an example of an operation in which the device that turns on the speaker performs a connection based on a designated frequency (e.g., an inaudible frequency (or a high frequency) (e.g., about 10 kHz to 300 GHz)). A wireless connection operation between devices, according to an embodiment, will be described in detail with reference to the drawings that will be described later.

According to an embodiment, the electronic device 101 and/or the external device 201 may provide, based on detecting the entry into the designated distance range therebetween, a guide (e.g., a second guide, an audio input guide, or an authentication guide) for authentication data (or information). In an embodiment, for example, the guide for authentication data may be provided visually through a display (e.g., the display device 160 in FIG. 1), may be provided acoustically through an output device (e.g., the sound output device 155 in FIG. 1), and/or may be provided tactilely through a haptic module (e.g., the haptic module 179 in FIG. 1). An operation of providing a guide, according to an embodiment, will be described in detail with reference to the drawings that will be described later.

According to an embodiment, the electronic device 101 and/or the external device 201 may perform authentication for wireless connection therebetween based on authentication data acquired from voice or a designated frequency, and may configure a connection (e.g., pairing) based on the authentication result. According to an embodiment, the electronic device 101 and/or the external device 201 may use address information of a counterpart device to automatically perform pairing with the counterpart device. In an embodiment, the address information may indicate information required for the electronic device 101 and the external device 201 to perform pairing. For example, the address information may include a MAC address and/or an IP address of a device. According to an embodiment, the electronic device 101 and/or the external device 201, for example, may provide address information to a counterpart device by using a packet data unit (PDU) inside an advertising packet in an advertising packet transmission/reception operation. According to an embodiment, an operation of configuring a wireless connection using address information of a device will be described with reference to the drawings that will be described later.

According to an embodiment, after the connection (e.g., pairing) is completed, the electronic device 101 and/or the external device 201 may communicate with the counterpart device. In an embodiment, the completion of connection may indicate a state in which data can be transmitted between the electronic device 101 and the external device 201. For example, the electronic device 101 may control the external device 201. In an embodiment, controlling the external device 201 may imply that the external device 201 operates based on data transmitted from the electronic device 101.

According to an embodiment, the electronic device 101 and/or the external device 201 may control a paired counterpart device by using an input device. For example, the electronic device 101 may control the functions (e.g., a channel and volume) of the paired external device 201 by using the input device of the electronic device 101. In an embodiment, the input device may indicate a device capable of receiving an instruction from a user. For example, the input device may include a button, a touch panel, a camera, a microphone, a keyboard, or a mouse of the electronic device 101.

Figure 3:
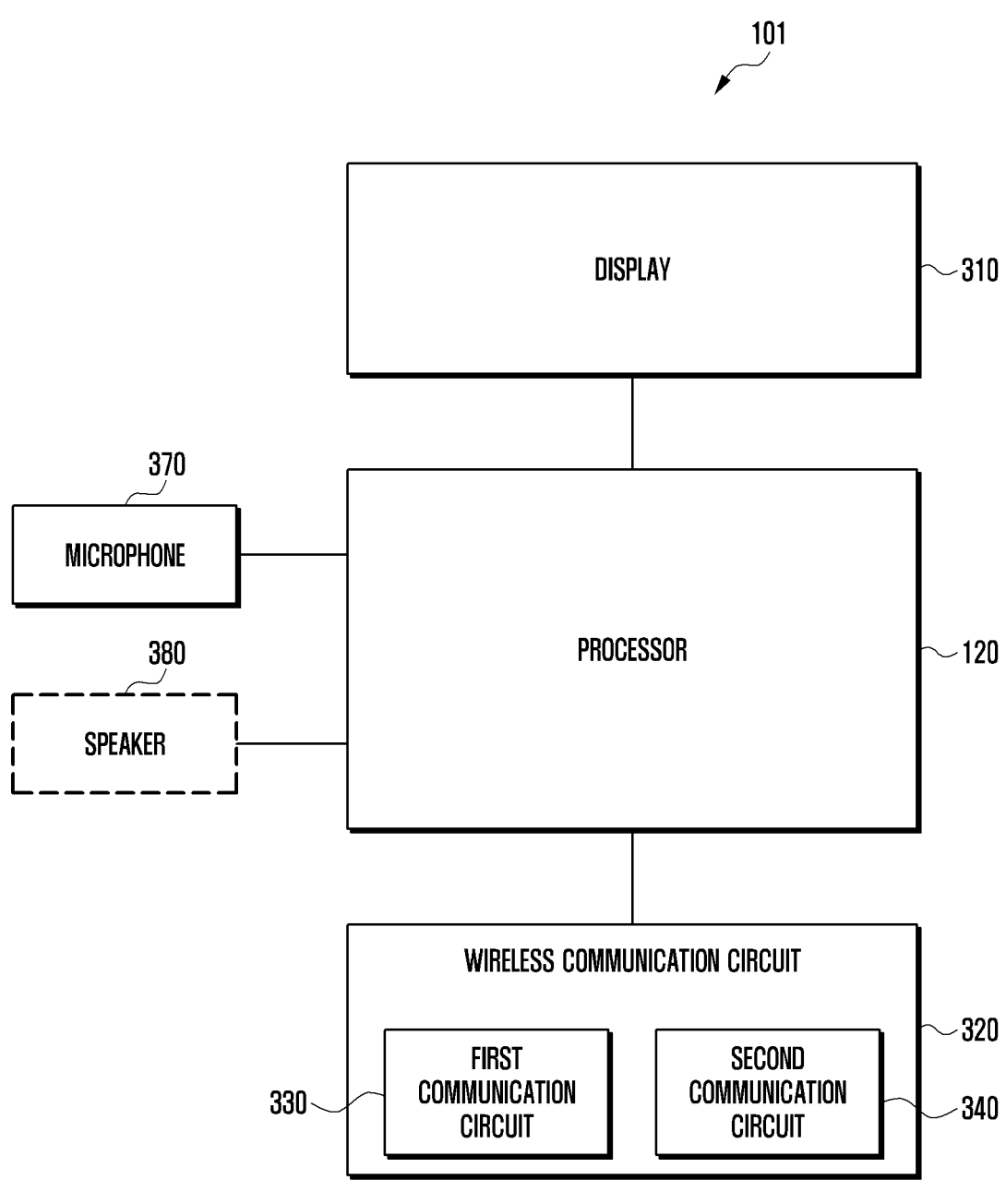
FIG. 3 schematically illustrates elements of an electronic device according to various embodiments.

FIG. 3 schematically illustrates elements of an electronic device according to various embodiments.

For example, FIG. 3 may show an example of elements related to executing (or processing) a function for a wireless connection to an external device 201 in an electronic device 101 according to various embodiments. According to an embodiment, the elements of the electronic device 101 illustrated in FIG. 3 may be included in the external device 201 in an identical or similar manner.

Referring to FIG. 3, the electronic device 101 according to an embodiment may include a display 310 (e.g., the display device 160 in FIG. 1), a wireless communication circuit 320 (e.g., the wireless communication module 192 in FIG. 1), a microphone 370, a speaker 380, and a processor 120.

According to an embodiment, the display 310 may visually provide information to a user of the electronic device 101. According to an embodiment, the display 310 may include a touch circuit, and may detect a touch input or a hovering input (or proximity input) by measuring, based on the touch circuit, a change in a signal (e.g., voltage, light quantity, resistance, or charge quantity) for a specific position of the display 310.

According to an embodiment, the display 310 may provide (e.g., display), under the control of the processor 120, a user interface related to a guide designated in an operation for a wireless connection to the external device 201. According to an embodiment, the display 310 may display a first user interface related to a proximity induction guide, a second user interface related to an audio input guide, and/or a third user interface related to an authentication guide.

According to an embodiment, the wireless communication circuit 320 may establish a wireless communication channel with the external device 201 and may support communication using the established communication channel. According to an embodiment, the wireless communication circuit 320 may include one or more communication circuits for supporting wireless communication. For example, the wireless communication circuit 320 may include a first communication circuit 330 and/or a second communication circuit 340. According to an embodiment, the first communication circuit 330 may communicate with the external device 201 through a first network (e.g., Bluetooth, BLE). According to another embodiment, the second communication circuit 340 may communicate with the external device 201 through a second network (e.g., Wi-Fi). According to an embodiment, the first communication circuit 330 and the second communication circuit 340 may be integrated into one element (e.g., a single chip), or may be implemented as multiple elements (e.g., multiple chips) separate from each other. According to an embodiment, the processor 120 may identify and authenticate the external device 201 within a communication network such as the first network or the second network by using address information of a counterpart device that is acquired through the wireless communication circuit 320.

According to an embodiment, the microphone 370 may transmit an input audio signal (e.g., a voice signal or an inaudible frequency signal) to the processor 120. According to an embodiment, the microphone 370 may receive an external sound signal and may process the same into electrical voice data. In the microphone 370, various noise reduction algorithms for removing noise generated in the process of receiving the external sound signal may be implemented. The microphone 370 may play a role of inputting audio streaming such as a voice command (e.g., a voice command to control wireless connection).

According to an embodiment, the speaker 380 may output the audio signal (e.g., an audible frequency signal or an inaudible frequency signal) received from the processor 120 to the outside. According to an embodiment, the speaker 380 may convert, under control of the processor 120, voice/sound data into audible and/or inaudible sound, and may output the audible and/or inaudible sound. According to an embodiment, the speaker 380 may output audio data received from the wireless communication circuit 320 or stored in a memory (e.g., the memory 130 in FIG. 1). The speaker 380 may also output sound signals related to various operations (functions) performed by the electronic device 101.

According to an embodiment, the processor 120 may detect a trigger for a wireless connection to the external device 201, and may search, based on the detecting of the trigger, for the external device 201 by using the wireless communication circuit 320. According to an embodiment, the processor 120 may provide, through the display 310, a guide for inducing the electronic device 101 and the external device 201 to be in proximity to each other within a designated range. According to an embodiment, when it is detected that the electronic device 101 and the external device 201 are in proximity to each other within the designated range, the processor 120 may perform a designated operation with the external device 201 to acquire an external signal. According to an embodiment, the processor 120 may perform, based on the acquired external signal, authentication for a wireless connection to the external device 201, and may configure the wireless connection to the external device 201, based on the authentication result.

According to an embodiment, the processor 120 may control the display 310 to display the first user interface related to a guide for inducing proximity between the devices based on detecting a trigger for wireless connection. According to an embodiment, the processor 120 may transmit, based on the detecting of the trigger for wireless connection, a service initiation request instructing the external device 201 to execute a designated operation. According to an embodiment, the designated operation may include an operation of turning on the microphone of the external device 201. According to an embodiment, the service initiation request may include address information of the electronic device 101, service initiation information, and/or external signal reception standby indication information.

According to an embodiment, the processor 120 may monitor the degree of proximity to the external device 201, and may identify, based on the monitoring result, that the electronic device 101 and the external device 201 are in proximity to each other within the designated range when the signal reception sensitivity of the electronic device 101 and the external device 201 reaches a designated threshold. According to an embodiment, based on detecting that the electronic device 101 and the external device 201 are in proximity to each other within the designated range, the processor 120 may control the display 310 to display the second user interface related to a guide for inducing a user's audio input. According to an embodiment, the processor 120 may control the microphone 370 related to a designated operation to be turned on with the displaying of the second user interface, and may receive an audio signal (e.g., a voice signal according to a user's utterance) from the outside (e.g., the user) through the microphone 370.

According to an embodiment, the processor 120 may acquire first authentication data, based on the audio signal, and may acquire second authentication data acquired based on the audio signal from the external device 201. According to an embodiment, the processor 120 may perform authentication for a wireless connection between the electronic device 101 and the external device 201, based on the data consistency between the first authentication data and the second authentication data.

According to an embodiment, the processor 120 may output a first designated frequency signal to the external device 201 through the speaker 380, based on detecting that the electronic device 101 and the external device 201 are in proximity to each other within the designated range. According to an embodiment, based on detecting that the electronic device 101 and the external device 201 are in proximity to each other within the designated range, the processor 120 may control the display 310 to display the third user interface related to a guide indicating that authentication is being performed with the external device 201. According to an embodiment, with the displaying of the third user interface, the processor 120 may control the speaker 380 related to a designated operation to be turned on, may encode a first authentication code into a designated frequency signal, and may output the designated frequency signal to the external device 201 through the speaker 380. According to an embodiment, the processor 120 may acquire a second designated frequency signal, which includes a second authentication code acquired based on the first designated frequency signal, from the external device 201 through the microphone 370, and may perform authentication for a wireless connection between the electronic device 101 and the external device 201 based on data consistency between the first authentication code and the second authentication code.

According to an embodiment, the external device 201 may include the elements of the electronic device 101 illustrated in FIG. 3, and may perform operations and/or functions of the corresponding elements.

An electronic device 101 according to various embodiments of the disclosure may include a microphone (e.g., the input device 150 in FIG. 1 or the microphone 370 in FIG. 3), a wireless communication circuit (e.g., the wireless communication module 192 in FIG. 1 or the wireless communication circuit 320 in FIG. 3), a display (e.g., the display device 160 in FIG. 1 or the display 310 in FIG. 3), a processor 120 operatively connected to the microphone, the wireless communication circuit, and the display, and a memory 130 operatively connected to the processor 120, wherein the memory 130 is configured to store instructions which, when executed, cause the processor 120 to detect a trigger for a wireless connection to an external device 201, search, based on the detecting of the trigger, for the external device 201 by using the wireless communication circuit, provide, through the display 310, a guide for inducing the electronic device 101 and the external device 201 to be in proximity to each other in a designated range, acquire an external signal through the microphone by performing a designated operation with the external device 201 when detecting that the electronic device 101 and the external device 201 are in proximity to each other within the designated range, perform authentication for the wireless connection to the external device 201 based on the acquired external signal, and configure, based on the authentication result, the wireless connection to the external device 201 by using the wireless communication circuit.

According to various embodiments of the disclosure, the instructions may cause the processor 120 to control the display 310 to display, based on the detecting of the trigger, a first user interface related to a guide for inducing proximity between devices.

According to various embodiments of the disclosure, the instructions may cause the processor 120 to transmit, based on the detecting of the trigger, a service initiation request, which instructs the external device to execute the designated operation, by using the wireless communication circuit.

According to various embodiments of the disclosure, the designated operation may include turning on a microphone of the external device, and the service initiation request may include address information of the electronic device, service initiation information, and/or external signal reception standby indication information.

According to various embodiments of the disclosure, the instructions may cause the processor 120 to monitor the degree of proximity to the external device by using the wireless communication circuit, and identify (or determine), based on the monitoring result, that the external device is in proximity within the designated range when the signal reception sensitivity of the electronic device and the external device reaches a designated threshold.

According to various embodiments of the disclosure, the instructions may cause the processor 120 to control the display 310 to display, based on detecting that the electronic device and the external device are in proximity to each other within the designated range, a second user interface related to a guide for inducing a user's audio input.

According to various embodiments of the disclosure, the instructions may cause the processor 120 to control a microphone related to the designated operation to be turned on with the displaying of the second user interface, and receive an audio signal from the outside through the microphone.

According to various embodiments of the disclosure, the instructions may cause the processor 120 to acquire first authentication data based on the audio signal, acquire, from the external device, second authentication data acquired based on the audio signal, and perform authentication for a wireless connection between the electronic device and the external device, based on data consistency between the first authentication data and the second authentication data.

According to various embodiments of the disclosure, the electronic device 101 may include a speaker (e.g., the sound output device 155 in FIG. 1 or the speaker 380 in FIG. 3), and the instructions may cause the processor 120 to output a first designated frequency signal to the external device through the speaker, based on detecting that the electronic device and the external device are in proximity to each other within the designated range.

According to various embodiments of the disclosure, the instructions may cause the processor 120 to control the display 310 to display, based on detecting that the electronic device and the external device are in proximity to each other within the designated range, a third user interface related to a guide indicating that authentication is being performed with the external device.

According to various embodiments of the disclosure, the instructions may cause the processor 120 to control a speaker related to the designated operation to be turned on with the displaying of the third user interface, encode a first authentication code in the first designated frequency signal and output the first designated frequency signal to the external device through the speaker, acquire a second designated frequency signal, including a second authentication code acquired based on the first designated frequency signal, from the external device through the microphone, and perform authentication for a wireless connection between the electronic device and the external device, based on data consistency between the first authentication code and the second authentication code.

According to various embodiments of the disclosure, the external signal may include a user's voice signal and/or a frequency signal using a speaker.

According to various embodiments of the disclosure, the instructions may cause the processor 120 to search, based on the detecting of the trigger, for nearby candidate external devices by using the communication circuit, provide objects related to the electronic device and the found candidate external devices through the first user interface, distinguishably provide the candidate external devices in the first user interface, based on the signal reception sensitivity of the found candidate external devices, determine a nearest candidate external device, among the candidate external devices, to be a target external device to be connected, and provide objects related to the electronic device and the target external device in the first user interface, based on the determination of the target external device.

Hereinafter, an operation method of an electronic device 101 according to various embodiments will be described in detail. According to various embodiments, operations performed by the electronic device 101 to be described below may be executed by a processor 120 including at least one processing circuit of the electronic device 101. According to an embodiment, the operations performed by the electronic device 101 may be stored in a memory 130, and may be executed by instructions which, when executed, cause the processor 120 to operate.

According to various embodiments, an electronic device 101 may include a display 310 (e.g., the display device 160 in FIG. 1), a wireless communication circuit 320, a display 310, at least one processor 120 operatively connected to the wireless communication circuit 320, and a memory 130 operatively connected to the at least one processor 120. According to various embodiments, the processor 120 may perform an operation related to providing a wireless connection between devices by using a learning model trained using an artificial intelligent (AI) algorithm. According to an embodiment, the processor 120 may use the learning model trained using an artificial intelligent (AI) algorithm to process operations related to detecting of the initiation of a connection service, displaying of a relevant user interface, turn-on control of a relevant element, and/or performing security authentication for a wireless connection. According to an embodiment, the processor 120 may perform an operation related to provision of a wireless connection between devices by using at least one of, for example, machine learning, neural network, genetic, deep learning, or a classification algorithm as the artificial intelligence algorithm FIG. 4 illustrates wireless connection operations between an external device and an electronic device according to various embodiments.

Figure 4:
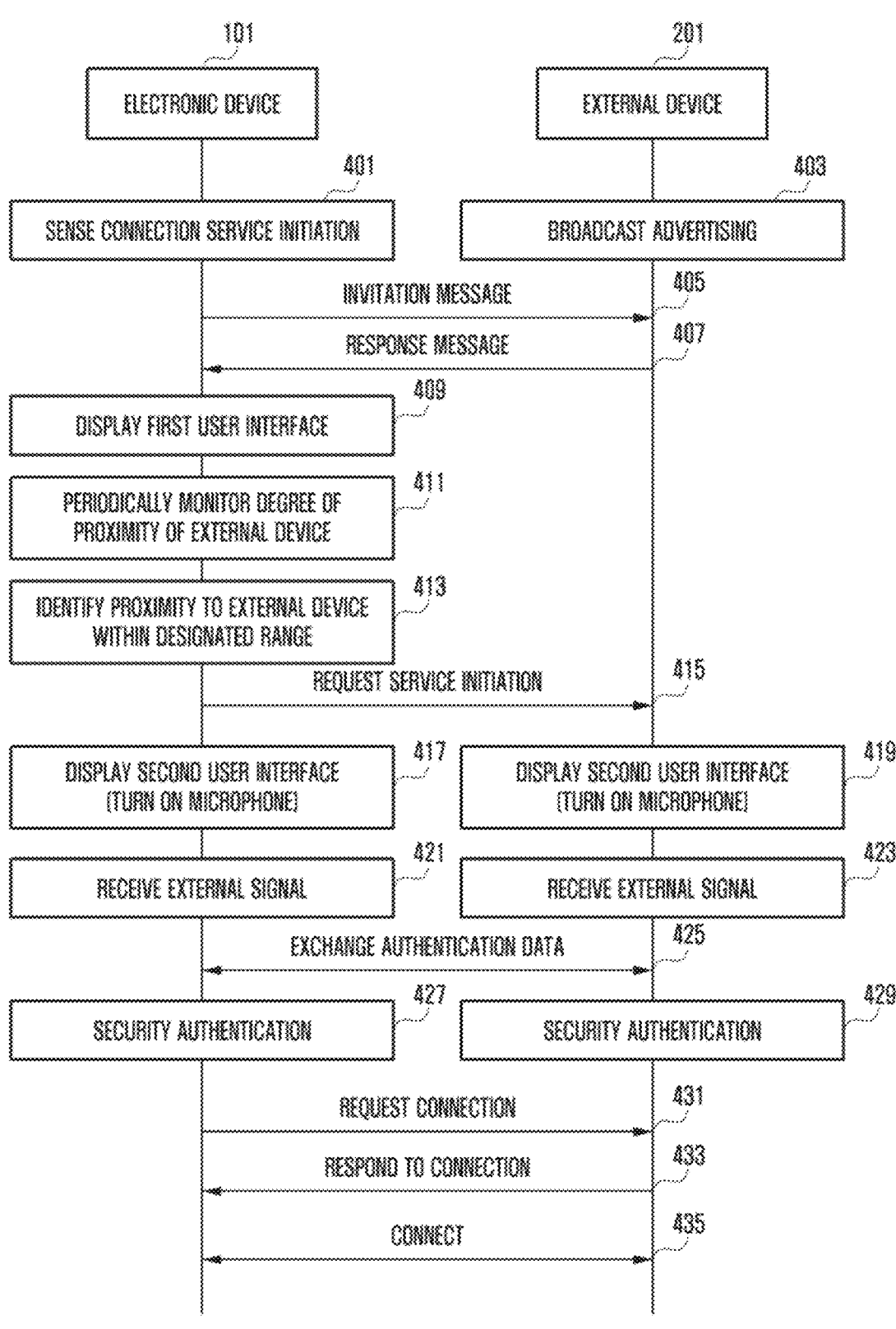
FIG. 4 illustrates wireless connection operations between an external device and an electronic device according to various embodiments.
Figure 5:
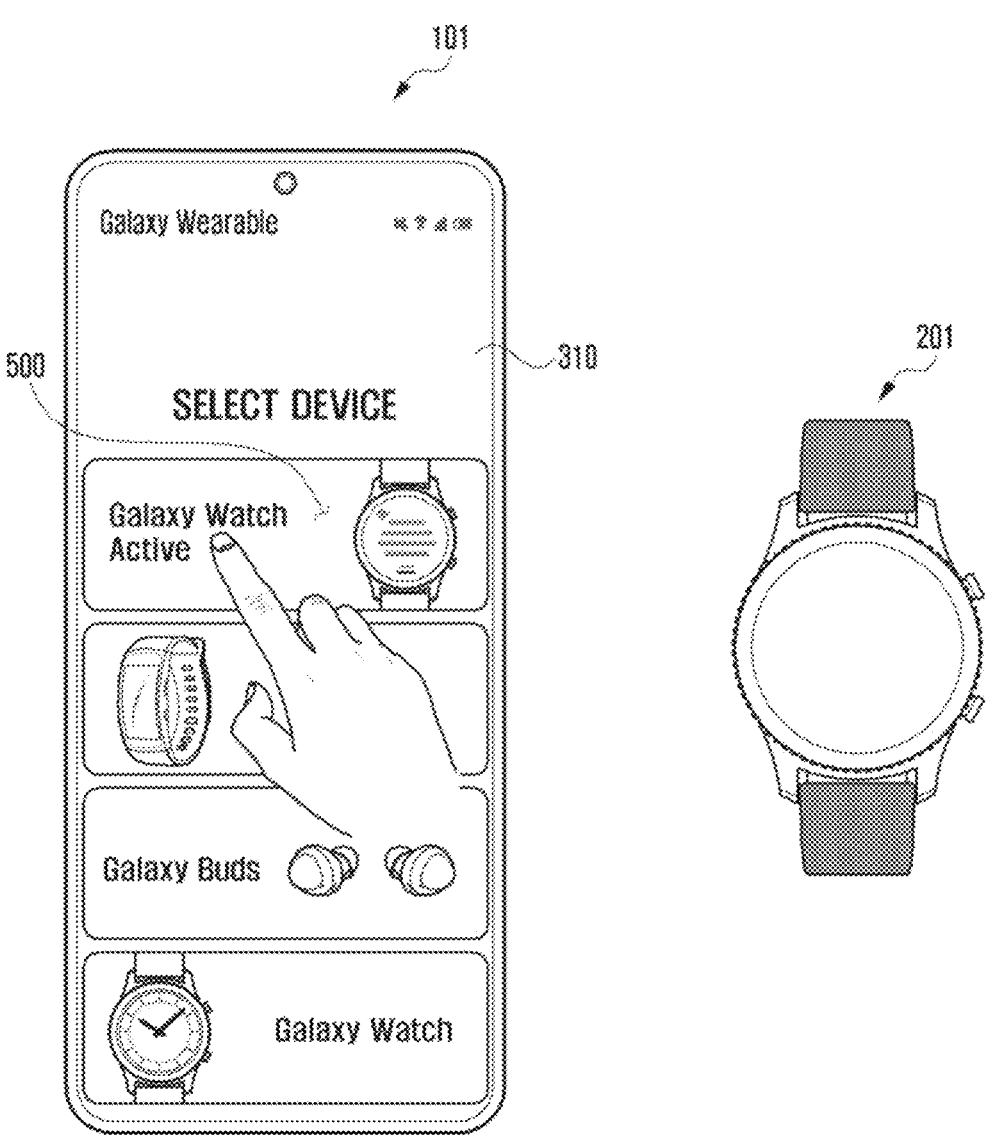
FIGS. 5, 6, 7, 8, and 9 illustrate examples of a user interface and an operation for wirelessly connecting an electronic device and an external device according to an embodiment.

Referring to FIG. 4, in operation 401, an electronic device 101 may detect a connection service initiation (or a trigger). According to an embodiment, the electronic device 101 may identify, based on various user inputs, a trigger related to a wireless connection to an external device 201. The user inputs may include, for example, execution of an application related to wireless connection configuration and/or a designated input (e.g., a touch, a gesture, an air gesture, and/or a voice command). According to an embodiment, an example in which a user initiates a connection service by using the electronic device 101 is illustrated in FIG. 5.

In operation 403, the external device 201 may be performing advertising broadcasting. According to an embodiment, a device that requests and manages a connection in Bluetooth (or Bluetooth low energy (BLE)) communication between devices such as the electronic device 101 and the external device 201 is called as a master (e.g., the electronic device 101 in FIG. 1 or FIG. 2), and a device that accepts the master's connection request and complies with a master's connection management is called a slave (e.g., the external device 201 in FIG. 2). For example, a master may indicate a device that initiates and manages a connection, and a slave may indicate a device that accepts a connection request according to timing of the master. In an embodiment, the electronic device 101 operates as a master and the external device 201 operates as a slave, but the disclosure is not limited thereto. For example, in an embodiment, the external device 201 may operate as a master and the electronic device 101 may operate as a slave.

According to an embodiment, the electronic device 101 and the external device 201 may be grouped into an advertiser and a scanner before Bluetooth communication is connected, and may be grouped into a master and a slave after connection. According to an embodiment, in an advertising operation (e.g., an advertiser and scanner group operation) before a connection between a master (e.g., the electronic device 101) and a slave (e.g., the external device 201), an advertiser (e.g., the external device 201) may advertise (e.g., advertising packet broadcast), and a scanner (e.g., the electronic device 101) may search for an advertiser that are advertising through a value included in an advertising packet (e.g., a packet data unit (PDU) in an advertising packet). According to an embodiment, the scanner may acquire identification information (e.g., device ID or address Information) of the advertiser through the advertising packet, and may identify the type of advertiser, based on the identification information. Then, when the advertiser and the scanner switch to a connected state (e.g., connected as the master and the slave), the scanner may switch to a master, and the advertiser may switch to a slave. According to an embodiment, among devices, a device that has relatively little power or requires low power consumption (e.g., smartphones, wearable devices) may function as a slave.

In operation 405, the electronic device 101 may transmit an invitation message to the external device 201, based on the detecting of connection service initiation. According to an embodiment, the electronic device 101 may recognize the existence of at least one nearby external device 201 found in the advertising operation, and may transmit (or broadcast) an invitation message for connection establishment to the at least one external device 201. According to an embodiment, the invitation message may be a message through which the electronic device 101 checks whether the external device 201 will perform a provisioning procedure (e.g., accept the invitation of the electronic device 101).

In operation 407, the external device 201 may receive the invitation message from the electronic device 101 and may transmit a response message (or a capability message) to the electronic device 101 in response to the invitation message. According to an embodiment, the response message (or the capability message) may include information indicating whether the external device 201 supports a wireless connection according to the disclosure, whether the external device 201 is capable of outputting information to the user, and/or whether the external device 201 is capable of receiving a value that is input from the user. The information indicating whether the wireless connection according to the disclosure is supported, for example, may include information related to whether the external device 201 supports an automatic connection based on a voice or using a designated frequency.

Figure 6:
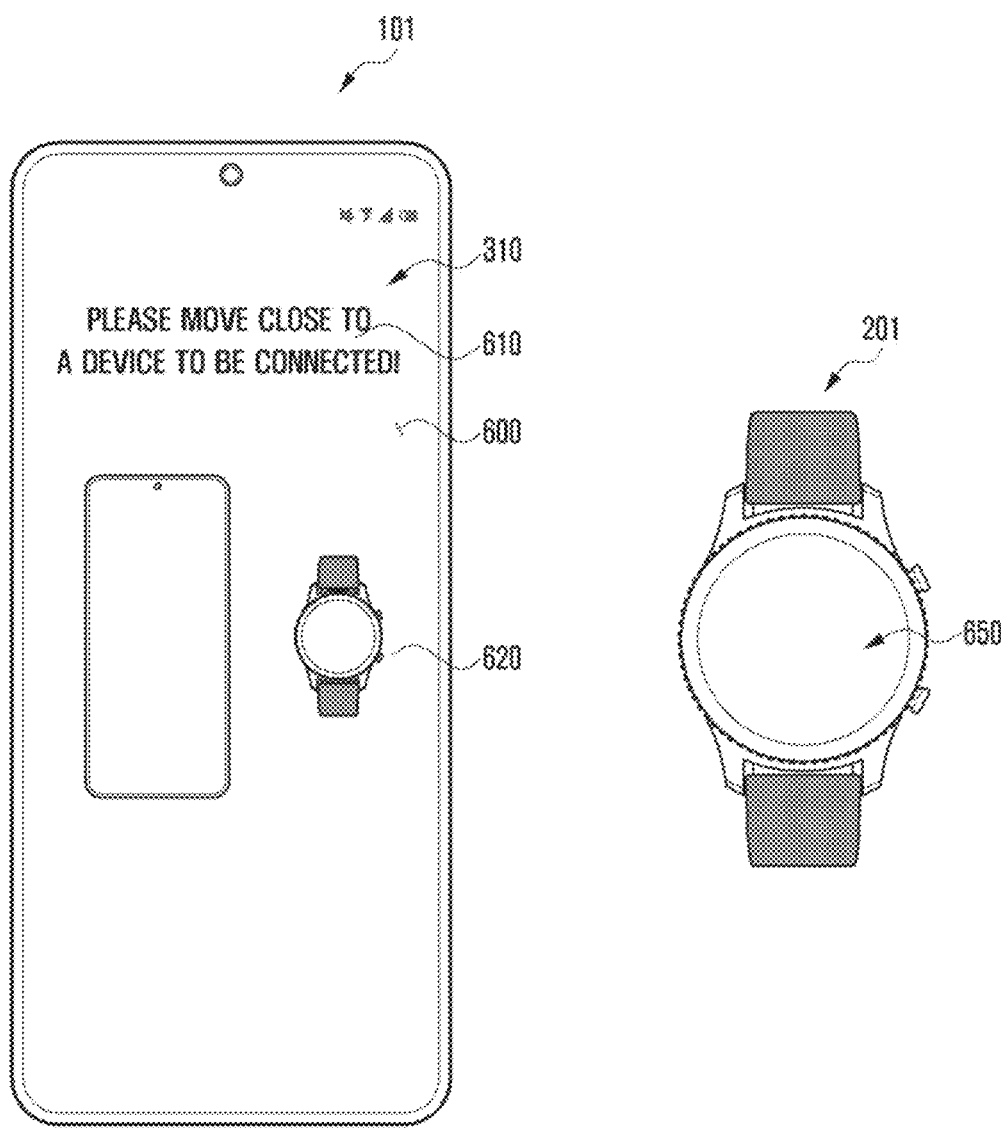

In operation 409, the electronic device 101 may receive the response message from the external device 201, and may display a first user interface through the display 310 in response to the reception of the response message. According to an embodiment, the electronic device 101 may provide a user interface related to a guide (e.g., a proximity induction guide) for inducing the electronic device 101 and the external device 201 to be in proximity to each other in terms of a distance (or location). According to an embodiment, an example of a user interface related to the proximity induction guide is shown in FIG. 6.

In operation 411, the electronic device 101 may monitor the degree of proximity of the external device 201. According to an embodiment, the monitoring period may include periodic and/or aperiodic periods. For example, the processor 120 may periodically and/or aperiodically monitor the degree of proximity of the external device 201, but is not limited thereto. According to an embodiment, the electronic device 101 may check the degree of proximity to the external device 201 in parallel or sequentially with operation 409, based on detecting the reception of the response message. In an embodiment, the electronic device 101 may check the degree of proximity to the external device 201, based on the signal reception sensitivity (e.g., the RSSI) between the same and the external device 201. According to an embodiment, the electronic device 101 may use a sensor such as a proximity sensor (e.g., an IR sensor and/or an ultrasonic sensor) and/or a distance sensor (e.g., a depth sensor and/or a time-of-flight (TOF) sensor) to measure direct distance information, thereby checking information about proximity to the external device 201.

In operation 413, the electronic device 101 may identify proximity to the external device 201 within a designated range. According to an embodiment, the electronic device 101 may determine, based on the monitoring result, the electronic device 101 and the external device 201 are in proximity to each other within the designated range when the signal reception sensitivity (e.g., RSSI) between the same and the external device 201 reaches a designated threshold.

In operation 415, the electronic device 101 may transmit a service initiation request to the external device 201. For example, the electronic device 101 may transmit, to the external device 201, a control message including a parameter that instructs the external device 201 to execute a designated operation (or a specific operation) related to security authentication according to the wireless connection. According to an embodiment, the designated operation may include an operation of turning on a microphone of the external device 201, and a specific value defined (or promised in advance) for turning on the microphone may be used as the parameter. According to an embodiment, the control message may include address information of the electronic device 101, service initiation information, and/or external signal (e.g., audio signal) reception standby indication information.

Figure 7:
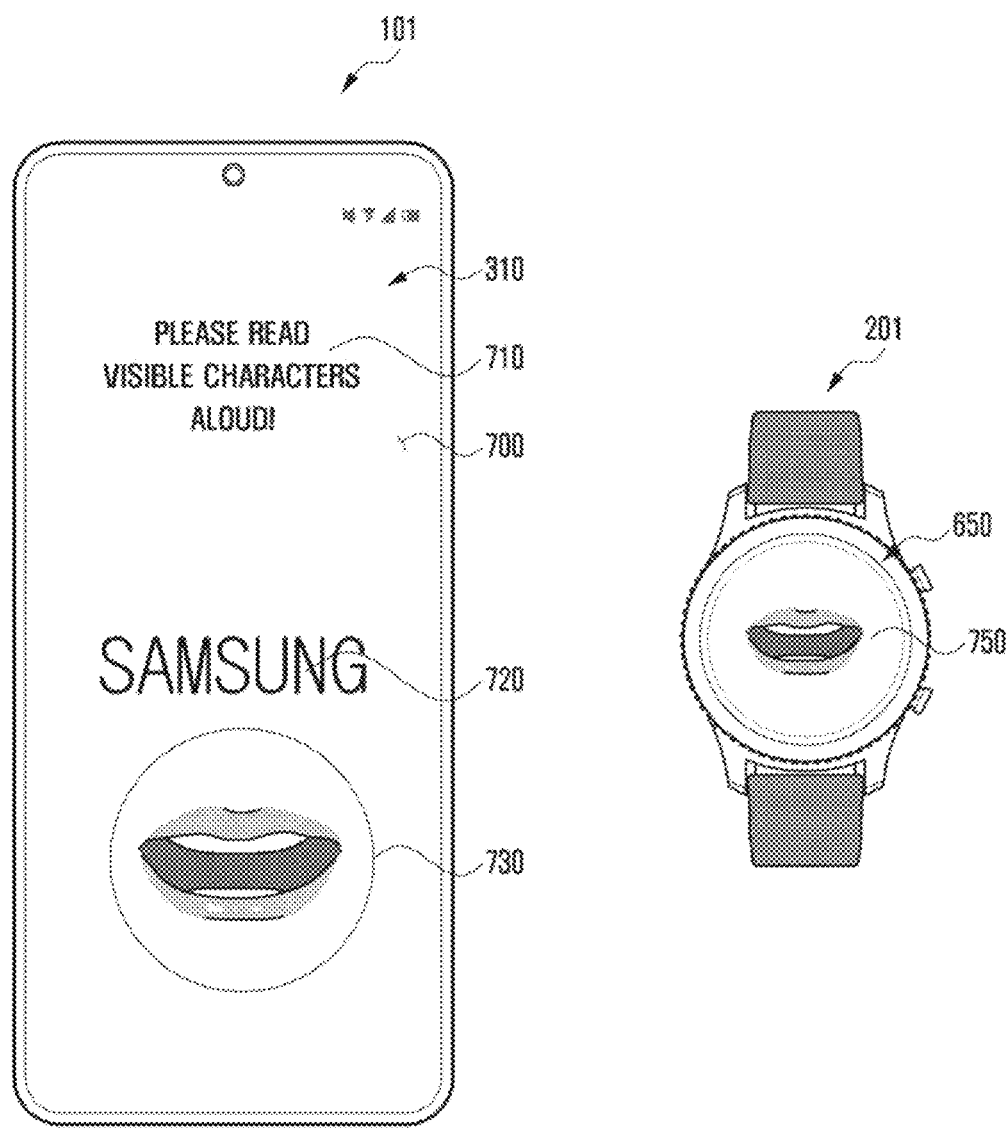

In operation 417, the electronic device 101 may display a second user interface through the display 310. According to an embodiment, when the electronic device 101 and the external device 201 reach an induced distance (or location), the electronic device 101 may provide a user interface related to a guide (e.g., an audio input guide) that induces an audio input (e.g., user voice utterance). An example of a user interface related to an audio input guide, according to one embodiment, is shown in FIG. 7. For example, the electronic device 101 may continuously guide the proximity induction guide based on the first user interface until the signal reception sensitivity between the same and the external device 201 reaches a designated threshold (e.g., a first threshold). The electronic device 101 may provide an audio input guide by switching from the first user interface to the second user interface when the signal reception sensitivity between the same and the external device 201 reaches the designated threshold. According to an embodiment, the electronic device 101 may control the microphone (e.g., the input device 150 in FIG. 1) to be turned on with the display of the second user interface in parallel, sequentially, or in reverse order, and may wait for an audio input.

In operation 419, the external device 201 may display the second user interface through a display (now shown). According to an embodiment, when the service initiation request is received from the electronic device 101, and/or when the electronic device 101 and the external device 201 reach the induced distance (or location), the external device 201 may provide a user interface related to a guide (e.g., an audio input guide) for inducing an audio input (e.g., user voice utterance). According to an embodiment, when the external device 201 is a device that does not include a display, operation 419 in which the external device 201 displays the second user interface may be omitted without being performed. According to an embodiment, when the external device 201 is a device that does not include a display, a guide related to an audio input may be provided using an output device (e.g., a speaker and/or a haptic module) included in the external device 201. For example, the external device 201 may output a guide related to an audio input as a designated audio signal through a speaker, or may output a guide related to an audio input as a vibration of a designated vibration pattern through a haptic module. When the service initiation request is received, and/or when the signal reception sensitivity with the electronic device 101 reaches a designated threshold, the external device 201 may control the microphone (e.g., the input device 150 in FIG. 1) to be turned on, and may wait for the audio input.

Figure 8:
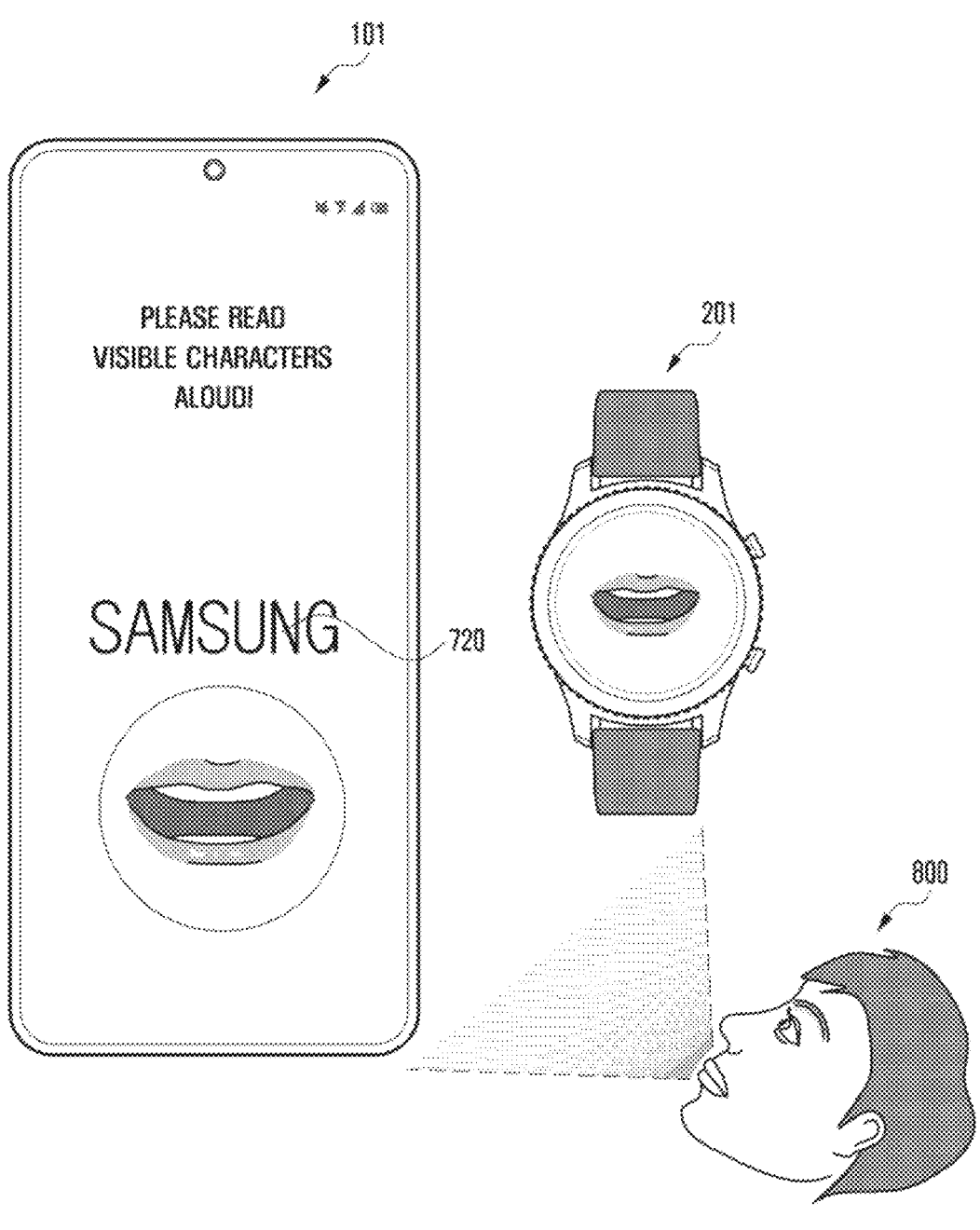

In operations 421 and 423, each of the electronic device 101 and the external device 201 may receive an external signal. According to an embodiment, the electronic device 101 and the external device 201 may receive an audio (e.g., a voice) uttered by the user through respective microphones. For example, in operations 421 and 423, the external signal may include a voice signal that is input through the microphones according to the user's utterance. An example of an operation related to an audio input, according to an embodiment, is illustrated in FIG. 8.

In operation 425, the electronic device 101 and the external device 201 may exchange authentication data. According to an embodiment, the electronic device 101 may transmit, to the external device 201, first authentication data acquired (e.g., generated) based on the voice input through the microphone of the electronic device 101 (e.g., voice information and/or time information acquired by the electronic device 101). According to an embodiment, the external device 201 may transmit, to the electronic device 101, second authentication data acquired (e.g., generated) based on the voice input through the microphone of the external device 201 (e.g., voice information and/or time information acquired by the external device 201). According to an embodiment, the first authentication data may include address information of the electronic device 101, and the second authentication data may include address information of the external device 201. According to an embodiment, the authentication data exchange between the electronic device 101 and the external device 201 may be performed by wireless communication (e.g., data packet exchange) in the absence of a connection (e.g., pairing) between the electronic device 101 and the external device 201. According to an embodiment, the authentication data exchange between the electronic device 101 and the external device 201 may be performed using designated wireless communication (e.g., BLE) or a designated frequency signal (e.g., an inaudible frequency (or high-frequency) signal).

In operation 427, the electronic device 101 may perform security authentication. According to an embodiment, the electronic device 101 may check data consistency (or data integrity) by using the authentication data of the electronic device 101 and the authentication data received from the external device 201. For example, the electronic device 101 may confirm the consistency between the data acquired based on the voice input through the microphone of the electronic device 101 (e.g., first voice information and first time information) (hereinafter referred to as "first authentication data") and the data acquired from the external device 201 (e.g., second voice information and second time information) (hereinafter referred to as 'second authentication data'). According to an embodiment, the electronic device 101 may check whether the first voice information matches the second voice information, and whether the first time information related to the first voice information (e.g., the time when the first voice information is generated) matches the second time information related to the second voice information (e.g., the time when the second voice information is generated).

In operation 429, the external device 201 may perform security authentication. According to an embodiment, the external device 201 may check data consistency (or data integrity) by using the authentication data of the external device 201 and the authentication data received from the electronic device 101. For example, the external device 201 may confirm the consistency of the data acquired based on the voice input through the microphone of the external device 201 (e.g., the second authentication data) and the data acquired from the electronic device 101 (e.g., the first authentication data). According to an embodiment, the external device 201 may check whether the second voice information matches the first voice information, and whether the second time information related to the second voice information matches the first time information related to the first voice information.

In operation 431, the electronic device 101 may transmit a connection request to the external device 201. According to an embodiment, the electronic device 101 may transmit a connection request message to the corresponding external device 201 when the data consistency is normally confirmed (or checked).

In operation 433, the external device 201 may receive the connection request from the electronic device 101 and transmit a connection response corresponding to the connection request to the electronic device 101. According to an embodiment, when the data consistency is confirmed (or checked) normally, the external device 201 may automatically accept the connection request message from the corresponding electronic device 101, and may transmit a connection response message to the corresponding electronic device 101. According to an embodiment, the external device 201 may compare the address information of the electronic device 101 according to the first authentication data with the address information of the electronic device 101 that requests the connection, and when the pieces of address information match each other, may operate to automatically accept the connection request from the electronic device 101. In an embodiment, it is exemplified that a connection request trigger is performed by the electronic device 101 that initiates a connection service, but various embodiments are not limited thereto. According to an embodiment, in operations 431 and 433, roles of the electronic device 101 and the external device 201 may be interchanged. For example, the connection request in operation 431 may be triggered (or started) by the external device 201, and the connection response in operation 433 corresponding thereto may be performed by the electronic device 101.

In operation 435, the electronic device 101 and the external device 201 may be connected to each other. According to an embodiment, the electronic device 101 and the external device 201 may complete the wireless connection therebetween, and may be configured to be in a state in which data can be transmitted between the electronic device 101 and the external device 201.

The electronic device 101 and the external device 201 may perform an operation for security authentication using a designated frequency (e.g., an inaudible frequency (or a high frequency).

According to an embodiment, in operation 415, the electronic device 101 may include the address information of the electronic device 101, service start information, and/or an external signal (e.g., a designated frequency signal) reception standby indication information in a control message related to the service initiation request to provide the control message to the external device 201. In an embodiment, the designated frequency signal may include, for example, an inaudible frequency signal and/or a high-frequency signal.

According to an embodiment, in operation 417, when the electronic device 101 and the external device 201 reach the induced distance (or location), the electronic device 101 may provide, in place of the second user interface, a third user interface related to a guide (e.g., an authentication guide) indicating that authentication is being performed with the external device 201. For example, when the signal reception sensitivity between the electronic device 101 and the external device 201 reaches a designated threshold (e.g., a second threshold), the electronic device 101 may switch from the first user interface to the third user interface and provide an authentication guide.

According to an embodiment, the electronic device 101 may control a speaker (e.g., the sound output device 155 in FIG. 1) to be turned on with the display of the third user interface in parallel, sequentially, or in reverse order, and may output the designated frequency signal through the speaker. For example, the electronic device 101 may transmit data by using inaudible sound waves that are inaudible to the human (e.g., the user) ear. For example, the electronic device 101 may include authentication data (or an authentication code) in a designated frequency (e.g., inaudible frequency (or high-frequency)) signal (e.g., a high frequency sound) and output the designated frequency signal to the outside (e.g., the external device 201) through the speaker, and the external device 201 may receive the designated frequency signal through the microphone of the external device 201. According to an embodiment, the first threshold and the second threshold may include different values. For example, a distance (or a distance range) according to the first threshold may be shorter than a distance according to the second threshold. For example, the second threshold may be configured to be equal to or greater than the first threshold.

According to an embodiment, in operation 419, when the service initiation request is received from the electronic device 101, and/or when the electronic device 101 and the external device 201 reach the induced distance (or location), the external device 201 may control the microphone to be turned on in order to receive a designated frequency signal (e.g., an inaudible frequency signal).

According to an embodiment, in operation 421, the electronic device 101 may output the designated frequency signal through the speaker, and in operation 423, the external device 201 may receive the designated frequency signal through the microphone. For example, in operation 423, the external signal may include a designated frequency signal that is output from the electronic device 101 through the speaker and input through the microphone of the external device 201.

A description of performing security authentication using a designated frequency (e.g., an inaudible frequency (or high-frequency)) by the electronic device 101 and the external device 201 according to an embodiment will be made with reference to FIGS. 17 and 18 that will be described later.

FIGS. 5, 6, 7, 8, and 9 illustrate examples of a user interface and an operation for wirelessly connecting an electronic device and an external device according to an embodiment.

According to an embodiment, in FIGS. 5 to 9, a user may be manipulating an electronic device 101, and an external device 201 may be another device existing in the same space (e.g., a living room) as the user. According to an embodiment, in FIGS. 5 to 9, the electronic device 101 is illustrated as a smartphone and the external device 201 is illustrated as a wearable device, but various embodiments are not limited thereto. For example, the electronic device 101 and the external device 201 may include various devices capable of wirelessly communicating with each other, as illustrated in FIG. 2. For example, the electronic device 101 may be a smartphone being operated by the user, and the external device 201 may be a wearable device worn by the user. In another example, the electronic device 101 may be a smartphone being operated by the user, and the external device 201 may be a TV or a display device. In another example, the electronic device 101 may be a wearable device being operated by the user, and the external device 201 may be an external speaker.

Referring to FIG. 5, the example in FIG. 5 shows an example in which the user initiates a service for connection to the external device 201 by using the electronic device 101. According to an embodiment, as illustrated in FIG. 5, the user may execute an application related to a wireless connection configuration by using the electronic device 101. The electronic device 101 may provide a user interface (or execution screen) related to the application through a display 310 in response to the user's request for application execution. According to an embodiment, the electronic device 101 may search for nearby external devices 201 internally (or by a background operation) based on the application execution, and may provide the user with a user interface 500 including information related to the found nearby external devices 201 as a list.

According to an embodiment, the user may perform a user input for connection to the external device 201, based on the user interface provided through the electronic device 101. For example, the user may select (e.g., touch) an item corresponding to a specific external device 201 from the list to execute a service of connection to the specific the external device 201 (e.g., a first connection method). According to an embodiment, the user may also execute a service of connection to all of the found external device 201 without designating a specific external device 201 (e.g., a second connection method). In an embodiment, the first connection method may be, for example, a method in which the user designates any one of the found external devices and makes a connection to the designated external device. In an embodiment, the second connection method may be, for an example, a method in which the user initiates a connection service based on all of the found external devices without designating any one of the found external devices and makes a connection to the external device 201 in proximity to the external device 201 which the user desires to connect while the connection service is performed (e.g., while the first user interface is provided).

According to an embodiment, when the initiation of the connection service is detected based on the user input, the electronic device 101 may transmit an invitation message to the external device 201, and may receive a response message corresponding to the invitation message from the external device 201. According to an embodiment, when the response message is received from the external device 201, the electronic device 101 may provide the user with a first user interface related to a proximity induction guide.

Referring to FIG. 6, the example in FIG. 6 indicates an example of providing a first user interface 600 related to a proximity induction guide in the electronic device 101 and/or the external device 201. According to an embodiment, FIG. 6 shows an example in which the first user interface 600 is provided through the display 310 of the electronic device 101, but various embodiments are not limited thereto. For example, in an embodiment, through a display 650 of the external device 201, the first user interface 600 may be changed and provided in a form capable of being provided by the external device 201. For example, the first user interface 600 for guiding proximity induction between devices may be provided through any one of the corresponding devices or may be provided through all of the devices.

According to an embodiment, the first user interface 600 may represent an interface for a guide (e.g., a proximity induction guide) for causing target devices (e.g., the electronic device 101 and the external device 201) for connection to be in proximity to each other in terms of a distance (or location), and may include at least one object (or information) for the guide. For example, the first user interface 600 may include a first object 610 (e.g., guidance text) such as "Please move close to a device to be connected!" and/or a second object 620 (e.g., images of devices) indicating the proximity state of at least two devices to be connected to each other (e.g., the electronic device 101 and the external device 201).

According to an embodiment, the electronic device 101 may monitor the degree of proximity (or distance (e.g., RSSI)) between the electronic device 101 and the external device 201 while the first user interface 600 is provided. According to an embodiment, when the external device 201 approaches the induced distance (or location), the electronic device 101 may transmit a control message instructing the external device 201 to execute a designated operation and induces an audio input (e.g., user voice utterance), and may provide the user with a second user interface related to a guide (e.g., an audio input guide) for inducing an audio input (e.g., user voice utterance). According to an embodiment, the electronic device 101 may turn on the microphone of the electronic device 101 in parallel, sequentially, or in reverse order with providing the second user interface (or transmitting the control message).

Referring to FIG. 7, the example in FIG. 7 indicates an example in which second user interfaces 700 and 750 related to an audio input guide are provided in the electronic device 101 and/or the external device 201. According to an embodiment, FIG. 7 shows an example in which the second user interfaces 700 and 750 are provided through the display 310 of the electronic device 101 and the display 650 of the external device 201, respectively, but various embodiments are not limited thereto. For example, in an embodiment, the second user interface 700 may be provided by a device (e.g., the electronic device 101) that initiates a connection service.

According to an embodiment, the second user interfaces 700 and 750 may indicate interfaces for guiding the user's audio input (e.g., user voice utterance) (e.g., an audio input guide), and may include at least one object (or information) for the guide. For example, the second user interfaces 700 and 750 may include a first object 710 (e.g., guide text) such as "Please read visible characters aloud!", a second object 720 such as "Samsung" (e.g., the user's utterance target character (or sentence)), and/or third objects 730 and 750 that induces the user's utterance (e.g., guide images). According to an embodiment, the second user interface 700 of the electronic device 101 and the second user interface 750 of the external device 201 may be different from each other in a provided form or in an element for a guide. For example, the second user interface 750 of the external device 201 may be provided after being changed (e.g., simplified) into a form capable of being provided by the external device 201. For example, as illustrated in FIG. 7, the second user interface 750 of the external device 201 may be provided based on a brief guide (e.g., the third object 750) corresponding to the size of the display 650.

According to an embodiment, the electronic device 101 and the external device 201 may receive an audio (e.g., a voice) from the user through a microphone while providing the second user interfaces 700 and 750.

Referring to FIG. 8, in the example in FIG. 8, a user 800 may perform utterance (e.g., "Samsung") corresponding to the second object 720 (e.g., the utterance target word "Samsung") provided through the second user interfaces 700 and 750 towards devices (e.g., the electronic device 101 and the external device 201) close to each other. According to an embodiment, the electronic device 101 and the external device 201 may receive an audio signal according to the user utterance through their respective microphones. According to an embodiment, when the reception of the audio signal is detected, the electronic device 101 and the external device 201 may generate authentication data based on the received audio signal. For example, the electronic device 101 may generate first authentication data (e.g., voice information and/or time information acquired by the electronic device 101), and the external device 201 may generate second authentication data (e.g., voice information and/or time information acquired by the external device 201).

According to an embodiment, the voice information may include voice recognition information (e.g., speech-to-text (STT) conversion information (e.g., text) and/or a voice waveform) for the audio signal input through the microphone. According to an embodiment, the time information may include the time at which the audio signal is input through the microphone, a time during which the audio signal is input, and/or a time within an allowable error range based on the time at which the audio signal is input.

According to an embodiment, the electronic device 101 and the external device 201 may exchange authentication data and perform security authentication to each other (or counterpart devices) based on the authentication data. According to an embodiment, during the security authentication according to the authentication data exchange, the electronic device 101 and the external device 201 may provide the user with a user interface related to a guide (e.g., a connection guide) indicating that a connection between devices is in progress.

Figure 9:
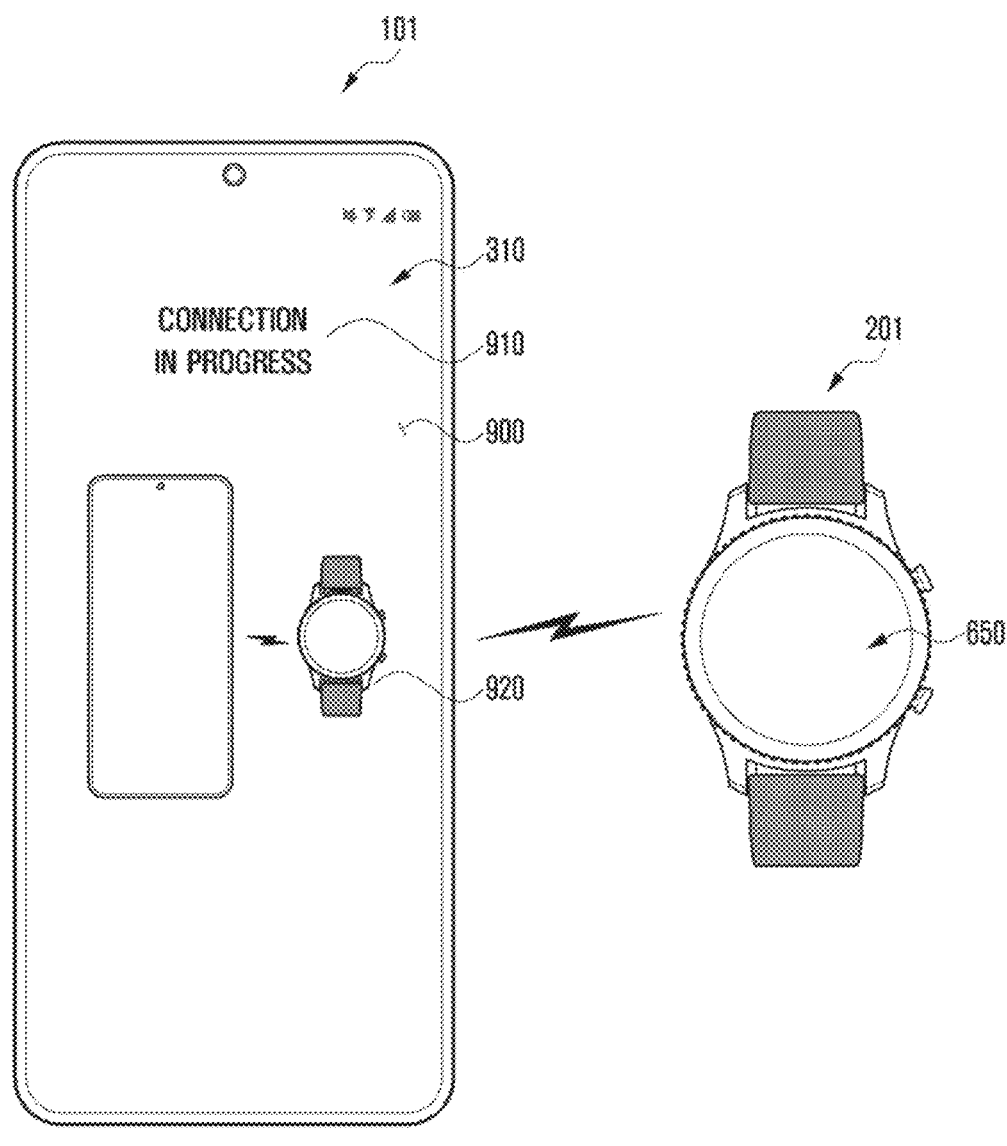

Referring to FIG. 9, the example in FIG. 9 indicates an example in which a user interface 900 related to a connection guide is provided in the electronic device 101 and/or the external device 201. According to an embodiment, FIG. 9 shows an example in which that the user interface 900 is provided through the display 310 of the electronic device 101, but various embodiments are not limited thereto. For example, in an embodiment, through the display 650 of the external device 201, the user interface 900 may be changed and provided in a form capable of being provided by the external device 201. For example, the user interface 900 for the progress state of connection between devices may be provided through any one of the corresponding devices or may be provided through all of the devices.

According to an embodiment, the user interface 900 may indicate an interface for indicating that connection between the devices (e.g., the electronic device 101 and the external device 201) is in progress, and may include at least one object (or information) for the guide. For example, the user interface 900 may include a first object 910 (e.g., guidance text) such as "Connection in progress" and/or a second object 920 indicating a connection progress state (e.g., images of devices and an image of wireless connection therebetween).

According to an embodiment, the electronic device 101 and the external device 201 may complete the wireless connection therebetween, and may be configured to be in a state in which data can be transmitted between the electronic device 101 and the external device 201.

Figure 10:
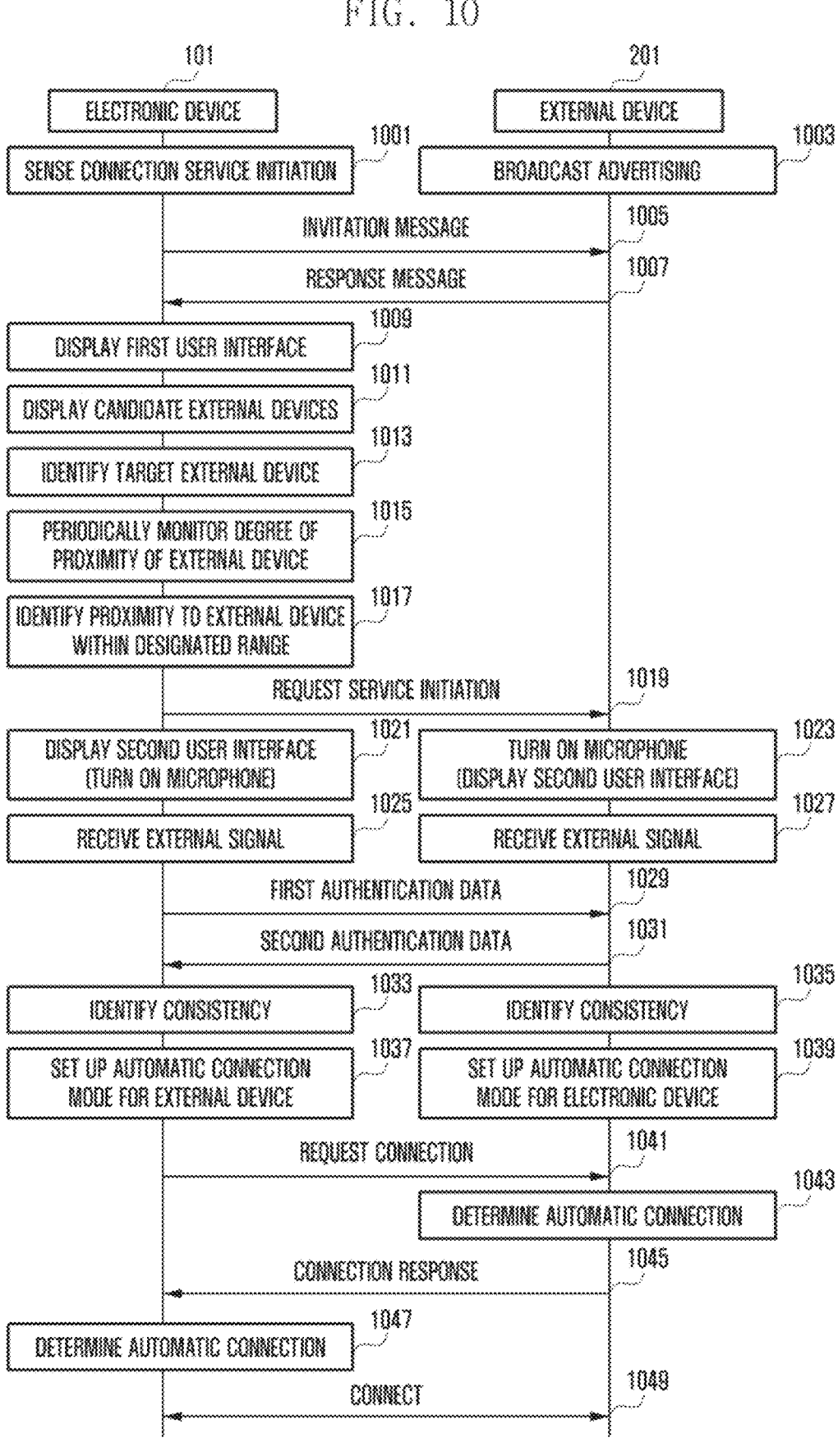
FIG. 10 illustrates wireless connection operations between an external device and an electronic device according to an embodiment.

FIG. 10 illustrates wireless connection operations between an external device and an electronic device according to an embodiment.

Referring to FIG. 10, in operation 1001, an electronic device 101 may detect a connection service initiation (or a trigger). According to an embodiment, the electronic device 101 may identify, based on a user input, a trigger related to a wireless connection to an external device 201. The user input may include, for example, execution of an application related to a wireless connection configuration and/or a designated input (e.g., a touch, a gesture, an air gesture, and/or a voice command).

In operation 1003, the external device 201 may be performing advertising broadcasting.

In operation 1005, the electronic device 101 may transmit an invitation message to the external device 201, based on the detecting of the connection service initiation. According to an embodiment, the electronic device 101 may recognize the existence of at least one nearby external device 201 found in the advertising operation, and may transmit (or broadcast) an invitation message for connection establishment to the at least one external device 201. According to an embodiment, the invitation message may be a message through which the electronic device 101 determines whether the external device 201 will perform a provisioning procedure (e.g., accept the invitation from the electronic device 101).

In operation 1007, the external device 201 may receive the invitation message from the electronic device 101 and transmit a response message (or a capability message) to the electronic device 101 in response to the invitation message. According to an embodiment, the response message (or the capability message) may include information indicating whether the external device 201 supports the wireless connection according to the disclosure, whether the external device 201 is capable of outputting information to the user, and/or whether the external device 201 is capable of receiving a value that is input from the user. The information indicating whether the wireless connection according to the disclosure is supported, for example, may include information related to whether the external device 201 supports an automatic connection based on a voice or using a designated frequency.

In operation 1009, the electronic device 101 may receive the response message from the external device 201 and display a first user interface through the display 310 in response to the reception of the response message. According to an embodiment, the electronic device 101 may provide a user interface related to a guide (e.g., a proximity induction guide) for inducing the electronic device 101 and the external device 201 to be in proximity to each other in terms of a distance (or location).

Figure 11:
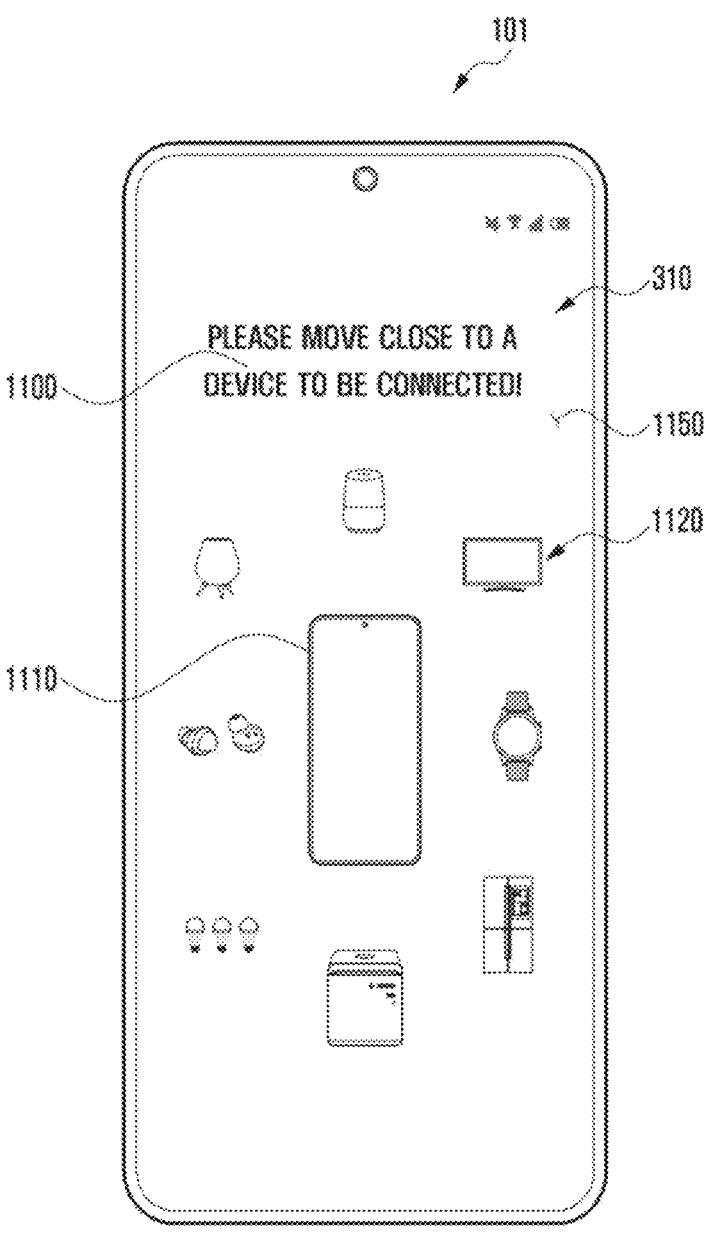
FIGS. 11, 12, and 13 illustrate examples of a user interface and an operation for wirelessly connecting an electronic device and an external device according to an embodiment.

In operation 1011, the electronic device 101 may display a candidate external device through the first user interface. According to an embodiment, the electronic device 101 may receive response messages from multiple external devices 201 nearby. According to an embodiment, when the response messages are received from the multiple external devices 201, the electronic device 101 may identify the multiple external devices 201 as candidate external devices to be connected to the electronic device 101. According to an embodiment, the electronic device 101 may provide an object (or information) (e.g., an image, text, and/or an icon) related to the identified candidate external devices through the first user interface. An example of the first user interface including a candidate external device, according to an embodiment, is illustrated in FIG. 11.

Figure 12:
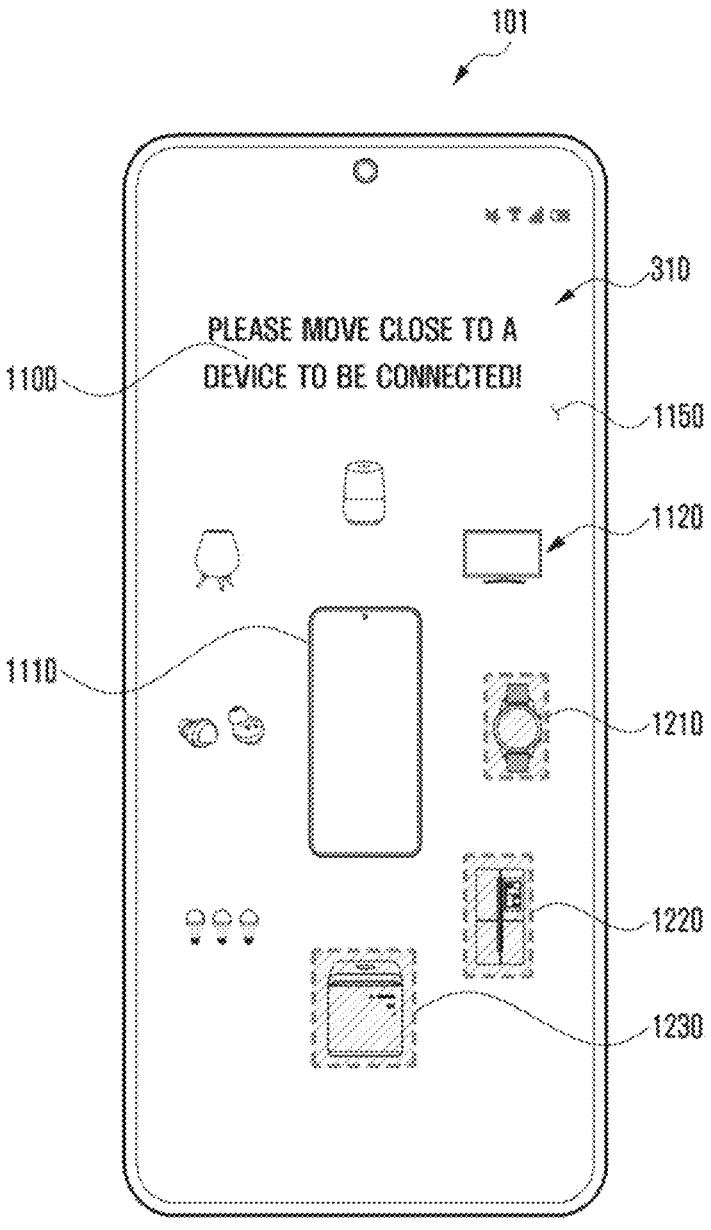

According to an embodiment, the electronic device 101 may provide at least one candidate external device, among the identified multiple candidate external devices, which has a relatively higher signal reception sensitivity (e.g., RSSI) (e.g., an external device having a similar RSSI) compared to other candidate external devices, so as to be distinguished from the other candidate external devices. For example, an object related to the at least one candidate external device having a relatively high signal reception sensitivity may be provided while being highlighted in a manner such as highlighting. According to an embodiment, if the signal reception sensitivity of a first external device is "about 100" (e.g., RSSI=100), the signal reception sensitivity of a second external device is "about 99" (e.g., RSSI=99, and the signal reception sensitivity of the other candidate external devices is "about 70", the electronic device 101 may highlight and display objects related to the first external device and the second external device. An example of the first user interface that distinguishably provides a candidate external device according to signal reception sensitivity, according to an embodiment, is illustrated in FIG. 12.

Figure 13:
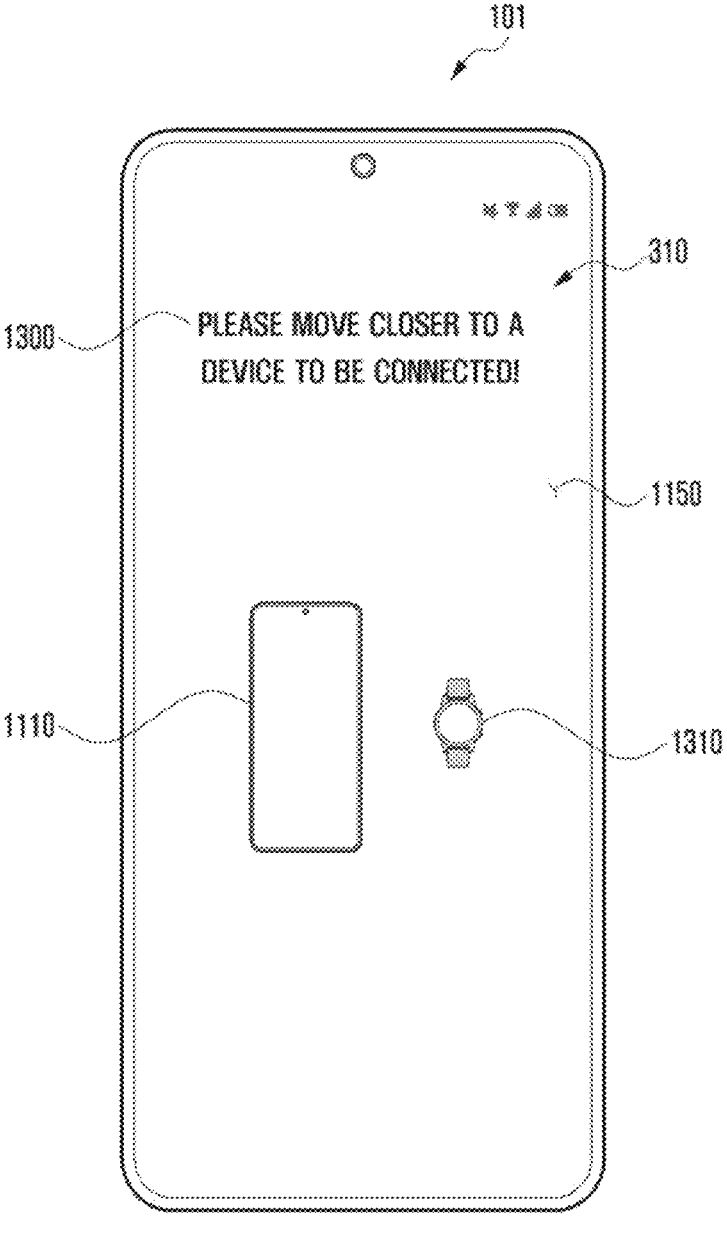

In operation 1013, the electronic device 101 may identify a target external device to be connected from among the multiple candidate external devices. According to an embodiment, the electronic device 101 may identify, as the target external device (e.g., the external device 201), a candidate external device, which has the highest signal reception sensitivity (e.g., RSSI) (or is nearest thereto), among the candidate external devices. For example, the electronic device 101 may check the signal reception sensitivity to determine an external device, which is close thereto with a predetermined distance (or is closest thereto), as the target external device. According to an embodiment, when identifying the target external device, the electronic device 101 may exclude the other candidate external devices from the first user interface, and may provide objects related to the electronic device 101 and the external device 201. According to an embodiment, the electronic device 101 may induce the electronic device 101 and the external device 201 to be in proximity to each other in terms of a distance (or location) through the first user interface. According to an embodiment, the electronic device 101 may induce, through an object and a guide related to the target external device, the electronic device 101 and the external device 201 to be positioned close to each other within a predetermined distance (a predetermined threshold). According to an embodiment, an example of the first user interface for inducing proximity of the target external device is shown in FIG. 13.

In operation 1015, the electronic device 101 may monitor the degree of proximity of the external device 201. According to an embodiment, the electronic device 101 may check the degree of proximity to the external device 201 in parallel or sequentially with operation 1009, based on detecting the reception of the response message. In an embodiment, the electronic device 101 may confirm the degree of proximity to the external device 201, based on the signal reception sensitivity (e.g., RSSI) between the same and the external device 201.

In operation 1017, the electronic device 101 may identify proximity to the external device 201 within a designated range. According to an embodiment, the electronic device 101 may determine, based on the result of the monitoring, that the electronic device 101 and the external device 201 are in proximity to each other within the designated range when the signal reception sensitivity (e.g., RSSI) between the same and the external device 201 reaches a designated threshold.

In operation 1019, the electronic device 101 may transmit a service initiation request to the external device 201. For example, the electronic device 101 may transmit, to the external device 201, a control message including a parameter that instructs the external device 201 to execute a designated operation related to security authentication according to a wireless connection. According to an embodiment, the designated operation may include an operation of turning on a microphone of the external device 201, and a specific value defined (or promised in advance) for turning on the microphone may be used as the parameter. According to an embodiment, the control message may include address information of the electronic device 101, service initiation information, and/or external signal (e.g., audio signal or a designated-frequency signal) reception standby indication information.

In operation 1021, the electronic device 101 may display a second user interface through the display 310. According to an embodiment, when the electronic device 101 and the external device 201 reach an induced distance (or location), the electronic device 101 may provide a user interface related to a guide (e.g., an audio input guide) that induces an audio input (e.g., user voice utterance). For example, the electronic device 101 may continuously induce a proximity induction guide based on the first user interface until the signal reception sensitivity between the same and the external device 201 reaches a designated threshold (e.g., a first threshold). The electronic device 101 may provide an audio input guide by switching from the first user interface to the second user interface when the signal reception sensitivity between the same and the external device 201 reaches the designated threshold. According to an embodiment, the electronic device 101 may control the microphone (e.g., the input device 150 in FIG. 1) to be turned on with the display of the second user interface in parallel, sequentially, or in reverse order, and may wait for an audio input.

In operation 1023, the external device 201 may control a microphone (e.g., the input device 150 in FIG. 1) in response to the service initiation request of the electronic device 101, and may wait for an audio input. According to an embodiment, the external device 201 may provide the second user interface through a display. According to another embodiment, the external device 201 may the microphone to be turned on when the signal reception sensitivity between the same and the electronic device 101 reaches the designated threshold, and may wait for audio input.

In operations 1025 and 1027, the electronic device 101 and the external device 201 may receive an external signal. According to an embodiment, the electronic device 101 and the external device 201 may receive an audio signal (e.g., a voice signal) uttered by the user through respective microphones. For example, in operations 1025 and 1027, the external signal may include a voice signal that is input through the microphones according to the user's utterance.

In operations 1029 and 1031, the electronic device 101 and the external device 201 may exchange authentication data.

According to an embodiment, in operation 1029, the electronic device 101 may transmit, to the external device 201, first authentication data acquired (e.g., generated) based on the voice signal input through the microphone of the electronic device 101 (e.g., voice information and/or time information acquired by the electronic device 101).

According to an embodiment, in operation 1031, the external device 201 may transmit, to the electronic device 101, second authentication data acquired (e.g., generated) based on the voice input through the microphone of the external device 201 (e.g., voice information and/or time information acquired by the external device 201).

According to an embodiment, the first authentication data may include address information of the electronic device 101, and the second authentication data may include address information of the external device 201. According to an embodiment, the authentication data exchange between the electronic device 101 and the external device 201 may be performed by wireless communication (e.g., data packet exchange) in the absence of a connection (e.g., pairing) between the electronic device 101 and the external device 201. According to an embodiment, the authentication data exchange between the electronic device 101 and the external device 201 may be performed using designated wireless communication (e.g., BLE) or a designated frequency signal (e.g., an inaudible frequency (or high-frequency) signal).

In operation 1033, the electronic device 101 may identify data consistency for security authentication. According to an embodiment, the electronic device 101 may check data consistency (or data integrity) by using the first authentication data of the electronic device 101 and the second authentication data received from the external device 201. For example, the electronic device 101 may confirm the consistency between the first authentication data acquired based on the voice signal input through the microphone of the electronic device 101 (e.g., first voice information and first time information) and the second authentication data acquired from the external device 201 (e.g., second voice information and second time information). According to an embodiment, the electronic device 101 may check whether the first voice information matches the second voice information, and whether the first time information related to the first voice information (e.g., the time when the first voice information is generated) matches the second time information related to the second voice information (e.g., the time when the second voice information is generated).

In operation 1037, when data consistency is normally confirmed (or checked), the electronic device 101 may configure an automatic connection confirmation mode for the external device 201. For example, the electronic device 101 may configure the automatic connection confirmation mode based on the address information of the external device 201. For example, when there is a connection request or a connection response from the external device 201 after the data consistency is confirmed (or checked), the electronic device 101 may check (e.g., compare) the address information of the external device 201, and automatically accept a connection provided that the address information of the external device 201 is address information configured in the automatic connection confirmation mode.

In operation 1035, the external device 201 may identify data consistency for security authentication. According to an embodiment, the external device 201 may check data consistency (or data integrity) by using the second authentication data of the external device 201 and the first authentication data received from the electronic device 101. For example, the external device 201 may confirm the consistency of the second authentication data acquired based on the voice signal input through the microphone of the external device 201 and the first authentication data acquired from the electronic device 101. According to an embodiment, the external device 201 may check whether the second voice information matches the first voice information, and whether the second time information related to the second voice information matches the first time information related to the first voice information.

In operation 1039, when data consistency is confirmed (or checked) normally, the external device 201 may configure an automatic connection confirmation mode for the electronic device 101. For example, the external device 201 may configure the automatic connection confirmation mode based on the address information of the electronic device 101. For example, when there is a connection request or a connection response from the electronic device 101 after the data consistency is confirmed (or checked), the external device 201 may check (e.g., compare) the address information of the electronic device 101, and automatically accept a connection provided that the address information of the electronic device 101 is address information configured in the automatic connection confirmation mode.

In operation 1041, the electronic device 101 may transmit a connection request to the external device 201. According to an embodiment, the electronic device 101 may transmit a connection request message to the corresponding external device 201 when the data consistency is normally confirmed (or checked).

In operation 1043, when the connection request is received from the electronic device 101, the external device 201 may determine an automatic connection to the electronic device 101. According to an embodiment, the external device 201 may compare the address information of the electronic device 101, from which the connection request has been received, with the address information of the electronic device 101, the consistency of which has been confirmed, and when the pieces of address information match each other, may automatically accept the connection to the electronic device 101. According to an embodiment, the external device 201 may compares the address information of the electronic device 101 according to the first authentication data with the address information of the electronic device 101 that requests the connection, and when the pieces of address information match each other, may operate to automatically accept the connection request from the electronic device 101. For example, the external device 201 may automatically accept the connection request from the electronic device 101 having address information of which the consistency is confirmed.

In operation 1045, the external device 201 may receive the connection request from the electronic device 101 and transmit a connection response corresponding to the connection request to the electronic device 101. According to an embodiment, when the data consistency is confirmed (or checked) normally, the external device 201 may automatically accept the connection request message from the corresponding electronic device 101, and may transmit a connection response message to the corresponding electronic device 101.

In an embodiment, it is exemplified that a connection request trigger is performed by the electronic device 101 that initiates a connection service, but various embodiments are not limited thereto. According to an embodiment, in operations 1041 and 1045, roles of the electronic device 101 and the external device 201 may be interchanged. For example, the connection request in operation 1041 may be triggered (or started) by the external device 201, and the connection response in operation 1045 corresponding thereto may be performed by the electronic device 101.

In operation 1047, when the connection response is received from the external device 201, the electronic device 101 may determine an automatic connection to the external device 201. According to an embodiment, the electronic device 101 may compare address information of the external device 201, from which the connection response has been received, with address information of the external device 201, the consistency of which has been identified, and when the pieces of address information match each other, may automatically accept the connection to the external device 201.

In operation 1049, the electronic device 101 and the external device 201 may be connected to each other. According to an embodiment, the electronic device 101 and the external device 201 may complete the wireless connection therebetween, and may be configured to be in a state in which data is transmitted between the electronic device 101 and the external device 201.

FIGS. 11, 12, and 13 illustrate examples of a user interface and an operation for wirelessly connecting an electronic device and an external device according to an embodiment.

According to an embodiment, FIGS. 11, 12, and 13 may show examples of a user interface related to a guide (e.g., a proximity induction guide) for inducing an electronic device 101 and an external device 201, which is to be connected, to be in proximity to each other in terms of a distance (or location).

Referring to FIG. 11, the electronic device 101 may display a candidate external device on a display 310 through a user interface 1150 related to a proximity induction guide. According to an embodiment, the electronic device 101 may identify multiple nearby external devices as candidate external devices to be connected to the electronic device 101. According to an embodiment, the user interface 1150 may include a first object 1110 related to the electronic device 101 (e.g., an image corresponding to the electronic device 101) and multiple second objects 1120 related to the identified candidate external devices (e.g., images corresponding to the external devices). For example, the user interface 1150 may arrange and provide the multiple second objects 1120 related to the candidate external devices around the first object 1110 related to the electronic device 101 according to the locations of the candidate external devices.

According to an embodiment, the user interface 1150 may include a guide object 1100 (e.g., guide text) such as "Please move close to a device to be connected!". According to an embodiment, the candidate external devices may include, for example, an external device that exists around the electronic device 101 and transmits a response message (or a capability message) in response to an invitation message of the electronic device 101.

According to an embodiment, the electronic device 101 may monitor the degree of proximity (or the distance (e.g., RSSI)) between the electronic device 101 and each of the candidate external devices while providing information related to the candidate external devices through the user interface 1150. According to an embodiment, when at least one external device, among the candidate external devices, is in proximity within a predetermined distance (e.g., when RSSI increases), the electronic device 101 may provide the at least one external device to be distinguished from other candidate external devices. An example thereof is illustrated in FIG. 12.

Referring to FIG. 12, the electronic device 101 may provide at least one candidate external device, among multiple candidate external devices, which has a relatively higher signal reception sensitivity (e.g., RSSI) (e.g., an external device having a similar RSSI) compared to other candidate external devices, so as to be distinguished from the other candidate external devices. For example, in the user interface 1150, the electronic device 101 may highlight and provide objects 1210, 1220, and 1230, which are related to the at least one candidate external device having a relatively high signal reception sensitivity, in a manner such as highlighting. According to an embodiment, if the signal reception sensitivity of a first external device is "about 100" (e.g., RSSI=100), the signal reception sensitivity of a second external device is "about 99" (e.g., RSSI=99), the signal reception sensitivity of a third external device is "about 98", and the signal reception sensitivity of the other candidate external devices is "about 70", the electronic device 101 may highlight and display the objects 1210, 1220, and 1230 related to the first external device, the second external device, and the third external device. According to an embodiment, the user interface 1150 may continuously provide the guide object 1100 (e.g., guide text) for guiding the electronic device 101 and a target external device for connection to be in proximity to each other in terms of a distance (or location).

According to an embodiment, the electronic device 101 may monitor the degree of proximity (or the distance (e.g., RSSI)) between the electronic device 101 and each of the candidate external devices while providing the user interface 1150. According to an embodiment, when any one external device 201, among the candidate external devices, is in proximity within a predetermined distance (e.g., when RSSI increases), the electronic device 101 may provide, through the user interface 1150, a guide for inducing a connection to the external device 201. An example thereof is illustrated in FIG. 13.

Referring to FIG. 13, the electronic device 101 may identify a target external device (e.g., the external device 201) to be connected from among multiple candidate external devices. According to an embodiment, the electronic device 101 may identify, as the target external device, a candidate external device, which has the highest signal reception sensitivity (e.g., RSSI) (or is nearest thereto), among the candidate external devices. For example, the electronic device 101 may check the signal reception sensitivity to determine an external device, which is close thereto with a predetermined distance, as the target external device.

According to an embodiment, when identifying the target external device, the electronic device 101 may exclude the other candidate external devices from the user interface 1150, and may provide the first object 1110 related to the electronic device 101 and an object 1310 related to the target external device 201. According to an embodiment, the electronic device 101 may induce, through the user interface 1150, the electronic device 101 and the target external device 201 to be in proximity to each other in terms of a distance (or location).

According to an embodiment, for the connection to the target external device 201, the electronic device 101 may more positively induce, through the object 1310 related to the target external device 201 and a guide object 1300, the electronic device 101 and the target external device 201 to be positioned closer to each other within a predetermined distance. For example, in the user interface 1150, a guide object 1300 such as "Please move closer to a device to be connected!" may be provided by updating (information updating) and changing the guide object 1100 which guides the electronic device 101 and the target external device 201 for connection to be in proximity to each other in a distance. For example, through the user interface 1150, the electronic device 101 may update a guide depending on a change in the distance between the electronic device 101 and the target the external device 201 and may provide the updated guide.

FIG. 14 is a flowchart illustrating an operation method of an electronic device according to various embodiments.

Referring to FIG. 14, in operation 1401, the processor 120 of the electronic device 101 may detect a connection service initiation (or a trigger). According to an embodiment, the processor 120 may identify, based on various user inputs, a trigger related to a wireless connection with the external device 201.

In operation 1403, the processor 120 may display a first user interface for a device-to-device proximity induction guide through the display 310. According to an embodiment, the processor 120 may transmit an invitation message to the external device 201, based on the detecting of the connection service initiation, and may receive a response message from the external device 201. According to an embodiment, in response to the reception of the response message, the processor 120 may provide a user interface related to a guide (e.g., the proximity induction guide) for inducing the electronic device 101 and the external device 201 to be in proximity to each other in terms of a distance (or location).

In operation 1405, the processor 120 may monitor the degree of proximity of the external device 201. According to an embodiment, the monitoring period may include periodic and/or aperiodic periods. For example, the processor 120 may periodically and/or aperiodically monitor the degree of proximity of the external device 201, but the disclosure is not limited thereto. According to an embodiment, the processor 120 may check the degree of proximity to the external device 201 in parallel or sequentially with the operation of displaying the first user interface. In an embodiment, the processor 120 may confirm the degree of proximity to the external device 201, based on the signal reception sensitivity (e.g., RSSI) between the same and the external device 201.

In operation 1407, the processor 120 may determine, based on the monitoring result, whether the electronic device 101 and the external device 201 enter a designated range. According to an embodiment, the processor 120 determines, based on the monitoring result, that the electronic device 101 and the external device 201 are in proximity to each other within the designated range when the signal reception sensitivity (e.g., RSSI) between the electronic device 101 and the external device 201 reaches a designated threshold.

In operation 1407, when the electronic device 101 and the external device 201 do not enter the designated range (e.g., "No" in operation 1407), the processor 120 may proceed to operation 1405 to continuously monitor proximity information, and may perform operation 1405 and subsequent operations. For example, the processor 120 may continuously induce the proximity induction guide based on the first user interface until the signal reception sensitivity between the electronic device 101 and the external device 201 reaches a designated threshold (e.g., a first threshold).

In operation 1407, when the electronic device 101 and the external device 201 enter the designated range (e.g., "Yes" in operation 1407), the processor 120 may display a second user interface through the display 310 in operation 1409. According to an embodiment, when the electronic device 101 and the external device 201 reach the induced distance (or location), the processor 120 may provide a user interface related to a guide (e.g., an audio input guide) for inducing an audio input (e.g., a user's voice utterance). According to an embodiment, the processor 120 may provide an audio input guide by switching from the first user interface to the second user interface when the signal reception sensitivity between the electronic device 101 and the external device 201 reaches the designated threshold.

According to an embodiment, the processor 120 may transmit a service initiation request to the external device 201 in parallel, sequentially, or in reverse order with the display of the second user interface. For example, the electronic device 101 may transmit, to the external device 201, a control message including a parameter which instructs the external device 201 to execute a designated operation related to security authentication according to a wireless connection. According to an embodiment, the designated operation may include an operation of turning on a microphone of the external device 201, and a specific value defined (or promised in advance) for turning on the microphone may be used as the parameter. According to an embodiment, the control message may include address information of the electronic device 101, service initiation information, and/or external signal (e.g., audio signal) reception standby indication information.

In operation 1411, the processor 120 may control a microphone to be turned on (or opened). According to an embodiment, the processor 120 may control the microphone (e.g., the input device 150 in FIG. 1) to be turned on in parallel, sequentially, or in reverse order with the display of the second user interface, and may wait for an audio input.

In operation 1413, the processor 120 may detect reception of an external signal through the microphone. According to an embodiment, the processor 120 may receive, through the microphone, an audio signal (e.g., a voice signal) uttered by a user. For example, the external signal may include a voice signal that is input through the microphone of the electronic device 101 according to the user's utterance.

In operation 1415, the processor 120 may perform security authentication. According to an embodiment, the processor 120 may check data consistency (or data integrity) by using first authentication data of the electronic device 101 and second authentication data received from the external device 201.

According to an embodiment, the processor 120 may exchange authentication data with the external device 201. According to an embodiment, the processor 120 may transmit, to the external device 201, the first authentication data acquired based on a voice signal input through the microphone of the electronic device 101 (e.g., first voice information and/or first time information acquired by the electronic device 101). According to an embodiment, the processor 120 may receive, from the external device 201, the second authentication data acquired based on a voice signal input through the microphone of the external device 201 (e.g., second voice information and/or second time information acquired by the external device 201).

According to an embodiment, the processor 120 may confirm the consistency between the first authentication data acquired based on a voice signal input through the microphone of the electronic device 101 (e.g., first voice information or first time information) and the second authentication data acquired from the external device 201 (e.g., second voice information or second time information).

According to an embodiment, the electronic device 101 may check whether the first voice information matches the second voice information, and whether the first time information related to the first voice information (e.g., the time when the first voice information is generated) matches the second time information related to the second voice information (e.g., the time when the second voice information.

According to an embodiment, the first authentication data may include address information of the electronic device 101, and the second authentication data may include address information of the external device 201. According to an embodiment, the authentication data exchange between the electronic device 101 and the external device 201 may be performed through wireless communication (e.g., data packet exchange) in the absence of a connection (e.g., pairing) between the electronic device 101 and the external device 201. According to an embodiment, the authentication data exchange between the electronic device 101 and the external device 201 may also be performed using designated wireless communication (e.g., BLE) or a designated frequency signal (e.g., an inaudible frequency (or high-frequency) signal).

In operation 1417, the processor 120 may configure a connection to the external device 201. According to an embodiment, the processor 120 may complete the wireless connection between the electronic device 101 and the external device 201, and may be configured to be in a state in which data can be transmitted between the electronic device 101 and the external device 201. According to an embodiment, the processor 120 may transmit a connection request message to the external device 201 when the data consistency is confirmed (or checked) normally. According to an embodiment, the processor 120 may configure a wireless connection with the external device 201 based on receiving a connection response message corresponding to the connection request message from the external device 201.

Figure 15:
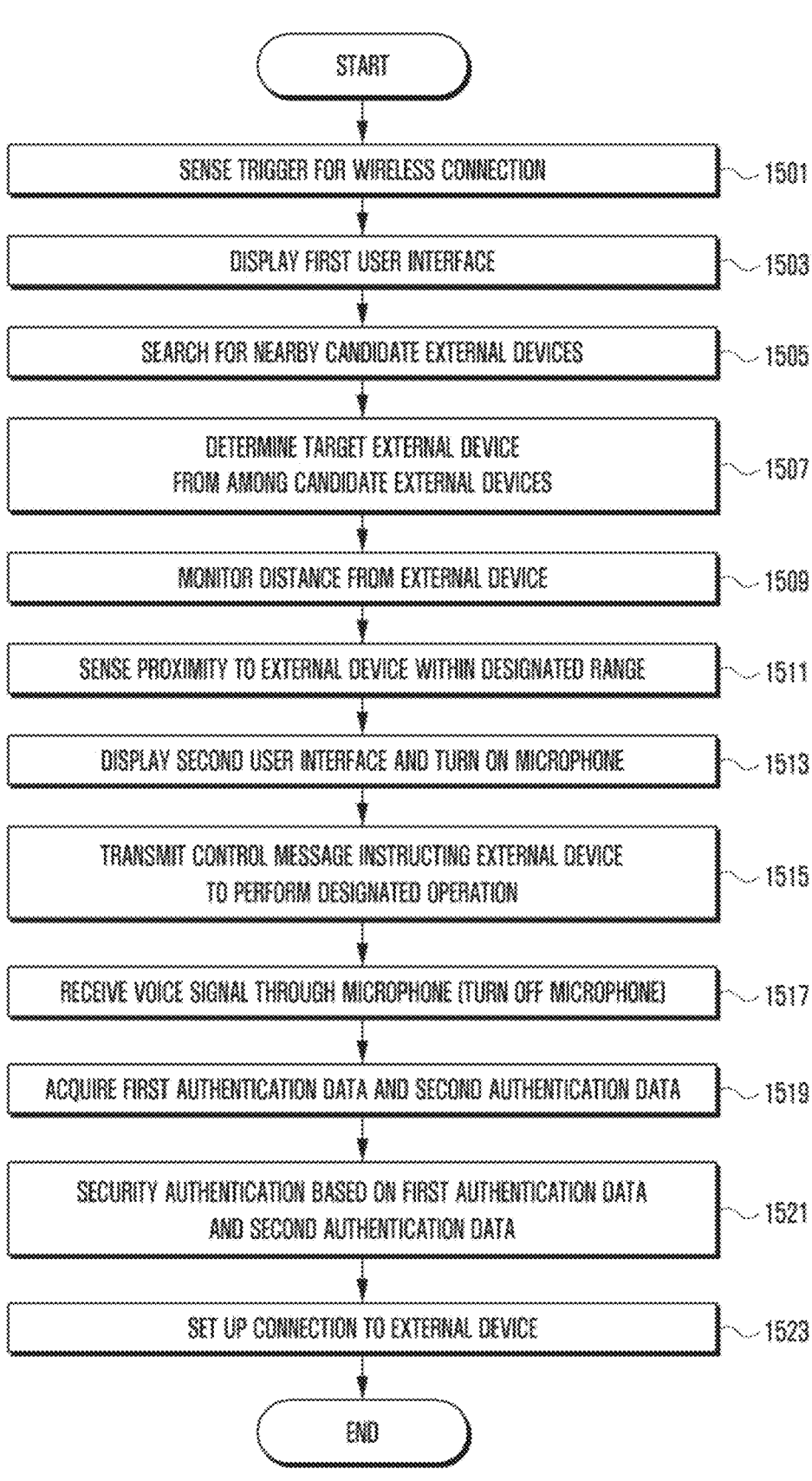
FIG. 15 is a flowchart illustrating an operation method of an electronic device according to various embodiments.

FIG. 15 is a flowchart illustrating an operation method of an electronic device according to various embodiments.

Referring to FIG. 15, in operation 1501, the processor 120 of the electronic device 101 may detect a connection service initiation (or a trigger). According to an embodiment, the processor 120 may identify, based on a user input, a trigger related to a wireless connection to the external device 201.

In operation 1503, the processor 120 may display a first user interface for a device-to-device proximity induction guide through the display 310. According to an embodiment, the processor 120 may transmit an invitation message to at least one nearby external device 201, based on the detecting of the connection service initiation, and may receive a response message from the at least one nearby external device 201.

In operation 1505, the processor 120 may search for nearby candidate external devices. According to an embodiment, the processor 120 may search for (or identify) nearby candidate external devices in response to the reception of the response message. According to an embodiment, the processor 120 may display the found candidate external devices through the first user interface. According to an embodiment, the processor 120 may receive response messages from multiple external devices 201 nearby. According to an embodiment, when the response messages are received from the multiple external devices 201, the processor 120 may identify the multiple external devices 201 as candidate external devices for connection with the electronic device 101. According to an embodiment, the processor 120 may provide an object (or information) (e.g., an image, text, and/or an icon) related to each of the identified candidate external devices through the first user interface.

In operation 1507, the processor 120 may determine (or identify) a target external device to be connected from among the candidate external devices. According to an embodiment, the processor 120 may identify a candidate external device, having the highest signal reception sensitivity (e.g., RSSI), among the candidate external devices, as the target external device (e.g., the external device 201). For example, the processor 120 may check signal reception sensitivity to determine an external device positioned close to a predetermined distance as the target external device.

According to an embodiment, when the target external device is identified, the processor 120 may exclude other candidate external devices from the first user interface and provide objects related to the electronic device 101 and the external device 201. According to an embodiment, the processor 120 may induce, through the first user interface, the electronic device 101 and the external device 201 to be in proximity to each other in terms of a distance (or location). According to an embodiment, the processor 120 may induce, through an object related to the target external device and the proximity induction guide, the electronic device 101 and the external device 201 to be positioned close to each other within a predetermined distance (a predetermined threshold.

In operation 1509, the processor 120 may monitor the distance (or the degree of proximity) to the external device 201. According to an embodiment, the processor 120 may confirm the degree of proximity degree between the electronic device 101 and the external device 201, based on the signal reception sensitivity (e.g., RSSI) between the electronic device 101 and the external device 201.

In operation 1511, the processor 120 may detect proximity to the external device 201 within a designated range. According to an embodiment, the processor 120 may determine, based on the monitoring resulting, that the electronic device 101 and the external device 201 are in proximity to each other within the designated range when the signal reception sensitivity (e.g., RSSI) between the electronic device 101 and the external device 201 reaches a designated threshold.

In operation 1513, based on detecting that the electronic device 101 and the external device 201 are in proximity to each other within the designated range, the processor 120 may control the display 310 to display a second user interface, and may control a microphone to be turned on. According to an embodiment, when the electronic device 101 and the external device 201 reach an induced distance (or location), the processor 120 may provide a user interface related to a guide (e.g., an audio input guide) inducing an audio input (e.g., user voice utterance). According to an embodiment, the processor 120 may provide an audio input guide by switching from the first user interface to the second user interface when the signal reception sensitivity between the electronic device 101 and the external device 201 reaches the designated threshold.

In operation 1515, the processor 120 may transmit, to the external device 201, a control message including a parameter that instructs the external device 201 to execute a designated operation. According to an embodiment, the designated operation may include an operation of turning on a microphone of the external device 201, and a specific value defined (or promised in advance) for turning on the microphone may be used as the parameter. According to an embodiment, the control message may include address information of the electronic device 101, service start information, and/or external signal (e.g., audio signal or designated frequency signal) reception standby indication information.

In operation 1517, the processor 120 may receive an external signal through the microphone. According to an embodiment, the processor 120 may receive, through the microphone, an audio signal (e.g., a voice signal) uttered by a user. For example, the external signal may include a voice signal that is input through the microphone according to the user's utterance. According to an embodiment, the processor 120 may perform an operation of controlling the microphone to be turned off, based on the completion of the reception of the external signal.

In operation 1519, the processor 120 may acquire first authentication data of the electronic device 101 and second authentication data of the external device 201. According to an embodiment, the processor 120 may acquire the first authentication data based on a voice signal input through the microphone of the electronic device 101 (e.g., first voice information and/or first time information acquired by the electronic device 101), and may receive, from the external device 201, the second authentication data acquired based on a voice signal input through the microphone of the external device 201 (e.g., second voice information and/or second time information acquired by the external device 201).

In operation 1521, the processor 120 may perform security authentication based on the first authentication data and the second authentication data. According to an embodiment, the processor 120 may check data consistency (or data integrity) by using the first authentication data of the electronic device 101 and the second authentication data received from the external device 201. For example, the processor 120 may confirm the consistency between the first authentication data (e.g., the first voice information or the first time information) of the electronic device 101 and the second authentication data (e.g., the second voice information or the second time information) received from the external device 201. According to an embodiment, the electronic device 101 may check whether the first voice information matches the second voice information, and whether the first time information related to the first voice information (e.g., the time when the first voice information is generated) matches the second time information related to the second voice information (e.g., the time when the second voice information is generated).

In operation 1523, the processor 120 may configure a connection to the external device 201 when the data consistency is confirmed (or checked) normally. According to an embodiment, the processor 120 may complete the wireless connection between the electronic device 101 and the external device 201, and may be configured to be in a state in which data can be transmitted between the electronic device 101 and the external device 201.

Figure 16:
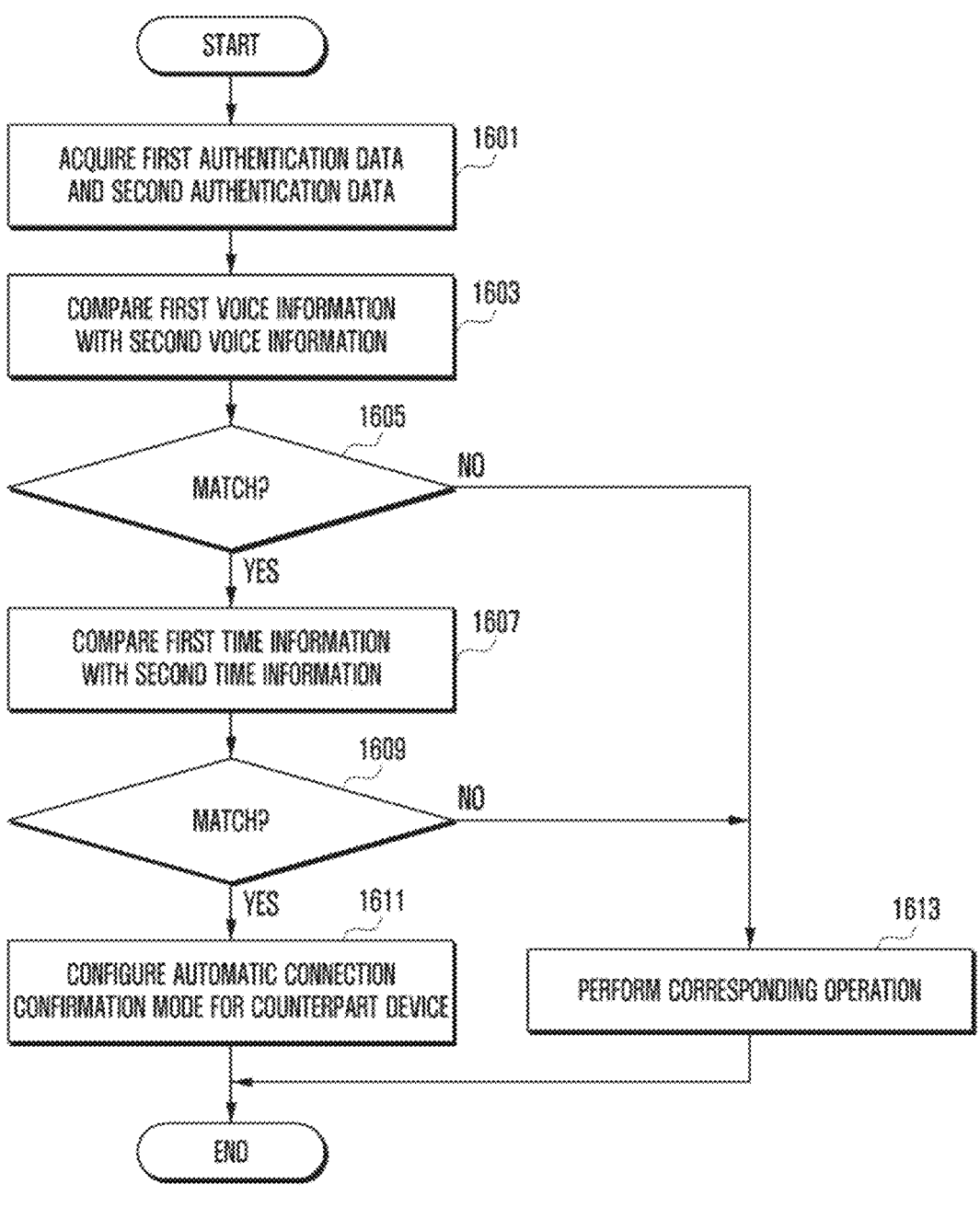
FIG. 16 is a flowchart illustrating an operation method of an electronic device according to various embodiments.

FIG. 16 is a flowchart illustrating an operation method of an electronic device according to various embodiments.

According to an embodiment, FIG. 16 may show an operation example in which the electronic device 101 performs security authentication (e.g., checks consistency). According to an embodiment, FIG. 16 illustrates an example in which the electronic device 101 performs security authentication, but various embodiments are not limited thereto. For example, the external device 201 may also perform security authentication based on an operation corresponding to FIG. 16.

Referring to FIG. 16, in operation 1601, the processor 120 of the electronic device 101 may acquire first authentication data of the electronic device 101 and second authentication data of the external device 201. According to an embodiment, the processor 120 may acquire the first authentication data based on a voice signal input through a microphone of the electronic device 101 (e.g., first voice information and/or first time information acquired by the electronic device 101), and may receive, from the external device 201, the second authentication data acquired based on a voice signal input through a microphone of the external device 201 (e.g., second voice information and/or second time information acquired by the external device 201).

In operation 1603, the processor 120 may compare the first voice information of the first authentication data with the second voice information of the second authentication data. According to an embodiment, the voice information may include voice recognition information (e.g., speech-to-text (STT) conversion information (e.g., text) and/or a voice waveform) regarding an audio input through the microphone. According to an embodiment, the processor 120 may compare STT conversion information (e.g., text) and/or a voice waveform according to the first voice information with STT conversion information (e.g., text) and/or a voice waveform according to the second voice information.

In operation 1605, the processor 120 may determine, based on the comparison result, whether the first voice information matches the second voice information.

In operation 1605, when the first voice information does not match the second voice information (e.g., "No" in operation 1605), the processor 120 may perform a corresponding operation in operation 1613. According to an embodiment, the processor 120 may terminate a wireless connection process currently being performed and provide error information to a user through a designated user interface. For example, the processor 120 may guide the resumption of an audio input operation when the authentication data does not match. According to an embodiment, for the resumption of an audio input operation, the processor 120 may further perform an operation of displaying a second user interface and turning on the microphone and an operation of re-transmitting a control message to the external device 201.

In operation 1605, when the first voice information matches the second voice information (e.g., "Yes" in operation 1605), the processor 120 may compare, in operation 1607, the first time information related to the first voice information (e.g., a time when the first voice information is generated) with the second time information related to the second voice information (e.g., a time when the second voice information is generated). According to an embodiment, the time information may include the time at which an audio is input through the microphone, a time during which the audio is input, and/or a time within an allowable error range based on the time at which the audio is input.

In operation 1609, the processor 120 may determine, based on the comparison result, whether the first time information matches the second time information.

In operation 1609, when the first time information does not match the second time information (e.g., "No" in operation 1609), the processor 120 may perform a corresponding operation in operation 1613. According to an embodiment, the processor 120 may terminate the wireless connection process currently being performed and provide error information to the user through a designated user interface. For example, when the authentication data does not match, the processor 120 may guide the resumption of an audio input operation. According to an embodiment, for the resumption of an audio input operation, the processor 120 may further perform an operation of displaying the second user interface and turning on the microphone and an operation of re-transmitting a control message to the external device 201.

In operation 1609, when the first time information matches the second time information (e.g., "Yes" in operation 1609), the processor 120 may configure an automatic connection confirmation mode for a counterpart device (e.g., the external device 201) in operation 1611. For example, the processor 120 may configure the automatic connection confirmation mode, based on address information of the external device 201. According to an embodiment, afterwards, when there is a connection request or a connection response from the external device 201, the processor 120 may confirm (e.g., compare) the address information of the external device 201, and may automatically accept the connection provided that the address information of the external device 201 is address information configured in the automatic connection confirmation mode.

According to various embodiments, FIG. 16 illustrates an example of performing security authentication through the voice information comparison according to operation 1603 and the time information comparison according to operation 1607 for security enhancement, but various embodiments are not limited thereto. For example, according to an embodiment, the processor 120 may perform security authentication based on any one of the voice information comparison according to operation 1603 or the time information comparison according to operation 1607. According to an embodiment, operations 1603 and 1605 and operations 1607 and operation 1609 are not limited to the illustrated order, and operations 1603 and 1605 and operations 1607 and 1609 may be performed sequentially, in parallel, in reverse order, or heuristically.

Figure 17:
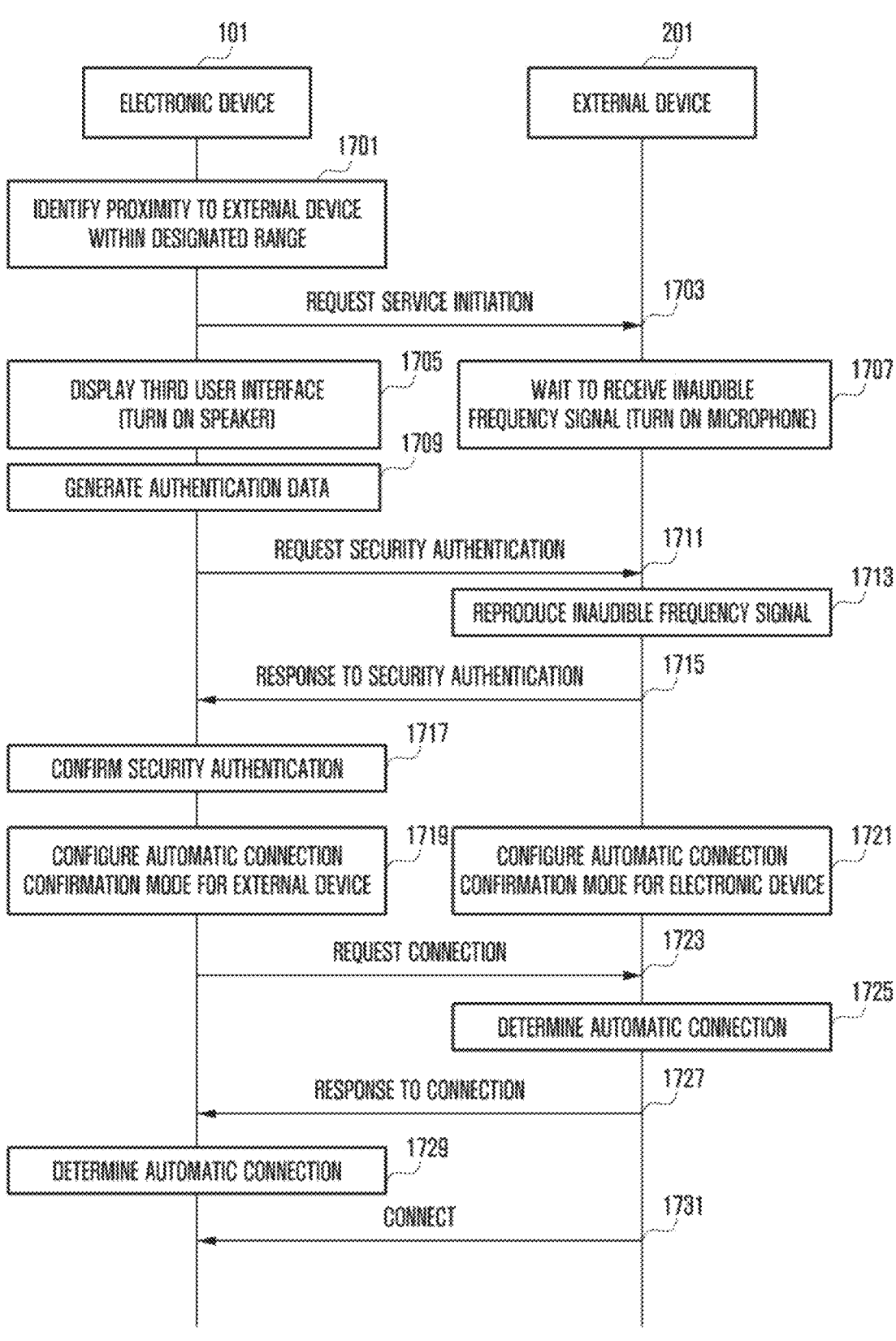
FIG. 17 illustrates wireless connection operations between an external device and an electronic device according to an embodiment.

FIG. 17 illustrates wireless connection operations between an external device and an electronic device according to an embodiment.

According to an embodiment, FIG. 17 shows an example of using a frequency signal (e.g., an inaudible frequency and/or high-frequency signal) designated for a wireless connection between an electronic device 101 and an external device 201. According to an embodiment, in FIG. 17, operations corresponding to operations 401 to 411 as illustrated in FIG. 4 (or operations 1001 to 1015 as illustrated in FIG. 10) may be performed, and a description of the corresponding operations will be omitted.

Referring to FIG. 17, in operation 1701, the electronic device 101 may identify proximity to the external device 201 within a designated range. According to an embodiment, the electronic device 101 may determine, based on the result of monitoring the degree of proximity of the external device 201, that the electronic device 101 and the external device 201 are in proximity to each other within the designated range when the signal reception sensitivity (e.g., RSSI) between the electronic device 101 and the external device 201 reaches a designated threshold.

In operation 1703, the electronic device 101 may transmit a service initiation request to the external device 201. For example, the electronic device 101 may transmit, to the external device 201, a control message including a parameter that instructs the external device 201 to execute a designated operation related to security authentication according to the wireless connection. According to an embodiment, the designated operation may include an operation of turning on a microphone of the external device 201, and a specific value defined (or promised in advance) for turning on the microphone may be used as the parameter. According to an embodiment, the control message may include address information of the electronic device 101, service initiation information, and/or external signal (e.g., designated frequency signal) reception standby indication information. In an embodiment, the designated frequency signal may include, for example, an inaudible frequency signal and/or a high-frequency signal.

According to an embodiment, the inaudible frequency signal may include a signal transmitted through a speaker in a frequency band other than an audible frequency. The audible frequency is a frequency signal in a band that can be heard by humans, and may correspond to, for example, a frequency band of about 20 Hz to about 20 KHz. The inaudible frequency may correspond to, for example, a frequency band which is less than about 20 Hz and/or exceeds about 20 KHz.

In operation 1705, the electronic device 101 may display a third user interface through the display 310. According to an embodiment, when the electronic device 101 and the external device 201 reach an induced distance (or location), the electronic device 101 may provide a user interface related to a guide (e.g., an authentication guide) indicating that the electronic device 101 is performing authentication with the external device 201. For example, the electronic device 101 may continuously induce a proximity induction guide based on a first user interface until the signal reception sensitivity between the electronic device 101 and the external device 201 reaches a designated threshold. The electronic device 101 may provide an authentication guide by switching from the first user interface to the third user interface when the signal reception sensitivity between the electronic device 101 and the external device 201 reaches the designated threshold. According to an embodiment, the electronic device 101 may control a speaker (e.g., the sound output device 155 in FIG. 1) to be turned on in parallel, sequentially, or in reverse order to the display of the third user interface.

In operation 1707, when the service initiation request is received from the electronic device 101, and/or when the electronic device 101 and the external device 201 reach the induced distance (or location), the external device 201 may wait to receive an inaudible frequency signal. According to an embodiment, the external device 201 may control the microphone of the external device 201 to be turned, and may wait to receive an inaudible frequency signal from the electronic device 101.

In operation 1709, the electronic device 101 may generate authentication data (or an authentication code (e.g., a personal identification number (PIN))) to be used for connection to the external device 201.

In operation 1711, the electronic device 101 may transmit a security authentication request including the authentication data (or the authentication code) to the external device 201. According to an embodiment, the electronic device 101 may put (or include) the authentication data in a designated frequency signal and may output the designated frequency signal through the speaker. According to an embodiment, depending on the performance of the microphones and/or speakers of the electronic device 101 and the external device 201, a frequency range for the designated frequency signal may be configured therebetween, and the electronic device 101 and the external device 201 may transmit and receive frequency signals based on the designated frequency range. According to an embodiment, the designated frequency signal may include an inaudible sound wave that is inaudible to the human (e.g., a user) ear, and/or a designated audible sound wave (e.g., a beep) that is audible to the human (e.g., the user).

For example, the electronic device 101 may transmit data (e.g., sound wave data) to the external device 201 by using an inaudible sound wave that is inaudible to the human (e.g., the user) ear. In an example, the electronic device 101 may put the authentication data into an inaudible frequency (or high-frequency) signal (e.g., a high-frequency sound) and output the inaudible frequency signal to the outside (e.g., the external device 201) through the speaker, and the external device 201 may receive the inaudible frequency signal through the microphone of the external device 201. According to an embodiment, the electronic device 101 may include an encoding operation for generating an authentication code in the inaudible frequency signal. For example, the electronic device 101 may encode the authentication code (e.g., a MAC address and/or a PIN) of the electronic device 101 in an inaudible frequency signal and output the inaudible frequency signal to the external device 201.

In operation 1713, the external device 201 may reproduce the inaudible frequency signal. According to an embodiment, when the security authentication request (e.g., the inaudible frequency signal) is received from the electronic device 101, the external device 201 may reproduce the inaudible frequency signal. For example, the external device 201 may reproduce the received inaudible frequency signal for a security authentication response (e.g., an inaudible frequency signal) in response to the security authentication request, and may output the reproduced inaudible frequency signal to the outside through a speaker of the external device 201.

According to an embodiment, the external device 201 may extract the authentication data (or the authentication code) from the inaudible frequency signal received through the microphone. According to an embodiment, the external device 201 may perform a decoding operation for interpreting the authentication code in the inaudible frequency signal. For example, the external device 201 may decode the authentication code (e.g., the MAC address and/or the PIN) of the electronic device 101 from the inaudible frequency signal to interpret (or extract or parse) the authentication code.

In operation 1715, the external device 201 may transmit a security authentication response to the electronic device 101 in response to the security authentication request. According to an embodiment, the external device 201 may transmit a secure authentication response including interpreted authentication data (e.g., the authentication code) to the electronic device 101. According to an embodiment, the external device 201 may turn on the speaker, and may output, through the speaker, a designated frequency signal in which the authentication data is put (or included). For example, the external device 201 may transmit sound wave data to the electronic device 101. In an example, the external device 201 may output an inaudible frequency (or high-frequency) signal (e.g., a high-frequency sound), in which the authentication data is put, to the outside (e.g., the electronic device 101) through the speaker, and the electronic device 101 may receive the inaudible frequency signal through the microphone of the electronic device 101.

According to an embodiment, the external device 201 may perform an encoding operation for generating an authentication code in the inaudible frequency signal. For example, the external device 201 may encode the interpreted authentication code (e.g., a MAC address and/or a PIN) of the electronic device 101 in the inaudible frequency signal, and may output the inaudible frequency signal to the electronic device 101.

In operation 1717, the electronic device 101 may confirm security authentication. According to an embodiment, the electronic device 101 may compare the authentication data generated in operation 1709 with the authentication data acquired from the designated frequency signal received from the external device 201 to determine whether the pieces of the authentication information match each other.

In operation 1719, the electronic device 101 may configure an automatic connection confirmation mode for the external device 201. According to an embodiment, the electronic device 101 may configure the automatic connection confirmation mode in parallel or sequentially with the operation of confirming the security authentication. According to an embodiment, the electronic device 101 may configure the automatic connection confirmation mode in parallel or sequentially with an operation of inputting authentication code decoded from the designated frequency signal from the external device 201.

In operation 1721, the external device 201 may configure an automatic connection confirmation mode for the electronic device 101. According to an embodiment, the external device 201 may configure the automatic connection confirmation mode in parallel or sequentially with the operation of transmitting the secure authentication response.

In operation 1723, the electronic device 101 may transmit a connection request to the external device 201. According to an embodiment, the electronic device 101 may transmit a connection request message to the corresponding external device 201.

In operation 1725, when the connection request is received from the electronic device 101, the external device 201 may determine an automatic connection to the electronic device 101. According to an embodiment, the external device 201 may confirm address information of the electronic device 101, from which the connection request is received, to automatically accept the connection to the electronic device 101.

In operation 1727, the external device 201 may receive the connection request from the electronic device 101, and may transmit a connection response corresponding to the connection request to the electronic device 101. According to an embodiment, the external device 201 may transmit a connection response message to the electronic device 101.

In operation 1729, when the connection response is received from the external device 201, the electronic device 101 may determine an automatic connection to the external device 201. According to an embodiment, the electronic device 101 may confirm address information of the external device 201, from which the connection response has been received, to automatically accept the connection to the external device 201.

In operation 1731, the electronic device 101 and the external device 201 may be connected to each other. According to an embodiment, the electronic device 101 and the external device 201 may complete the wireless connection therebetween, and may be configured to be in a state in which data can be transmitted between the electronic device 101 and the external device 201.

According to an embodiment, FIG. 17 illustrates an example in which, in order to enhance security, both the electronic device 101 and the external device 201 provide authentication codes by using designated frequency signals, and the electronic device 101 performs security authentication based on whether the authentication codes match each other. For example, in operations 1709 and 1711, the electronic device 101 may encode an authentication code of the electronic device 101 in a designated frequency signal and may provide the designated frequency signal to the external device 201.

For example, in operations 1713 and 1715, the external device 201 may interpret the authentication code of the electronic device 101, may encode the interpreted authentication code of the electronic device 101 interpreted in a designated frequency signal, and may provide the designated frequency signal to the electronic device 101. For example, illustrated is an example in which the electronic device 101 performs security authentication by checking whether the authentication code generated by the electronic device 101 matches the authentication code acquired from the inaudible frequency signal from the external device 201. However, various embodiments are not limited thereto, and security authentication may also be performed in a manner in which either the electronic device 101 or the external device 201 encodes an authentication code in a designated frequency signal and provides the designated signal, and the other device inputs the authentication code as an authentication code for wireless connection.

According to an embodiment, in operation 1705, the operation of the electronic device 101 may be replaced with an operation of turning on the microphone, and in operation 1707, the operation of the external device 201 may be replaced with an operation of turning on the speaker. According to an embodiment, the electronic device 101 may not perform operation 1709, and the external device 201 may perform an authentication data generation operation corresponding to operation 1709.

In this case, the electronic device 101 may transmit a security authentication request (e.g., a message or a packet) to the external device 201 in operation 1711, and the external device 201 may encode an authentication code of the external device 201 in a designated frequency signal in operation 1713, and may output the designated frequency signal through the speaker in operation 1715. According to an embodiment, the electronic device 101 may decode, in operation 1717, the authentication code of the external device 201 based on the designated frequency signal and automatically input the decoded authentication code as an authentication code for a wireless connection to the external device 201, and may perform subsequent operations.

FIG. 18 is a flowchart illustrating an operation method of an electronic device according to various embodiments.

According to an embodiment, FIG. 18 shows an example of using a designated frequency signal (e.g., an inaudible frequency and/or high-frequency signal) for a wireless connection between the electronic device 101 and the external device 201. According to an embodiment, in FIG. 18, operations corresponding to operations 1401 to 1403 as illustrated in FIG. 14 (or operations 1501 to 1503 as illustrated in FIG. 15) may be performed, and a description of the corresponding operations will be omitted.

Referring to FIG. 18, in operation 1801, the processor 120 of the electronic device 101 may monitor a distance (or proximity) to the external device 201. According to an embodiment, the processor 120 may confirm the degree of proximity between the electronic device 101 and the external device 201 based on the signal reception sensitivity (e.g., RSSI) between the electronic device 101 and the external device 201.

In operation 1803, the processor 120 may detect proximity to the external device 201 within a designated range. According to an embodiment, the processor 120 may determine, based on the monitoring result, that the electronic device 101 and the external device 201 are in proximity to each other within the designated range when the signal reception sensitivity (e.g., RSSI) between the electronic device 101 and the external device 201 reaches a designated threshold.

In operation 1805, based on detecting that the electronic device 101 and the external device 201 are in proximity to each other within a designated range, the processor 120 may control the display 310 to display a user interface, and may control a speaker to be turned on. According to an embodiment, when the electronic device 101 and the external device 201 reach an induced distance (or location), the processor 120 may provide a user interface related to a guide (e.g., an authentication guide) indicating that authentication is being performed with the external device 201. According to an embodiment, when the signal reception sensitivity between the electronic device 101 and the external device 201 reaches the designated threshold, the processor 120 may switch from a first user interface to a third user interface to provide an authentication guide.

In operation 1807, the processor 120 may generate a first authentication code (e.g., a PIN and/or a MAC address) to be used for connection to the external device 201.

In operation 1809, the processor 120 may output a designated frequency signal including the first authentication code to the external device 201 through the speaker. According to an embodiment, the processor 120 may transmit data (e.g., sound wave data) to the external device 201 by using an inaudible sound wave that is inaudible to the human (e.g., a user) ear. According to an embodiment, the processor 120 may encode the authentication code (e.g., the MAC address and/or the PIN) of the electronic device 101 in an inaudible frequency signal and output the inaudible frequency signal to the external device 201.

According to an embodiment, the processor 120 may control the microphone to be turned on in parallel or sequentially with the operation of outputting the designated frequency signal, and may wait to receive a designated frequency signal from the external device 201. According to an embodiment, the processor 120 may turn off the speaker. According to an embodiment, when the electronic device 101 always drives the speaker, turn-on and turn-off operations of the speaker may be omitted.

In operation 1811, the processor 120 may receive a designated frequency signal from the external device 201. According to an embodiment, the external device 201 may extract the first authentication code from the designated frequency signal received from the electronic device 101. For example, the external device 201 may interpret (or extract or parse) the first authentication code of the electronic device 101 in the inaudible frequency signal, based on decoding for interpretation of the first authentication code in the inaudible frequency signal. According to an embodiment, the external device 201 may encode an interpreted authentication code (e.g., a second authentication code) of the electronic device 101 in an inaudible frequency signal, and may output the inaudible frequency signal to the electronic device 101. For example, the external device 201 may put the second authentication code into an inaudible frequency signal and output the inaudible frequency signal to the electronic device 101 through the speaker of the external device 201, and the processor 120 may receive the inaudible frequency signal through the microphone of the electronic device 101.

In operation 1813, the processor 120 may acquire the second authentication code from the designated frequency signal received from the external device 201. According to an embodiment, the processor 120 may interpret (or extract or parse) the second authentication code from the inaudible frequency signal, based on decoding for interpreting the second authentication code in the designated frequency signal received from the external device 201.

In operation 1815, the processor 120 may perform security authentication based on the first authentication code and the second authentication code. According to an embodiment, the processor 120 may check data consistency by using the first authentication code of the electronic device 101 and the second authentication code acquired from the external device 201. For example, the processor 120 may compare the first authentication code with the second authentication code to check whether the first authentication code matches the second authentication code. Thereafter, the processor 120 may configure a wireless connection to the external device 201, based on the result of performing the security authentication.

Figure 19:
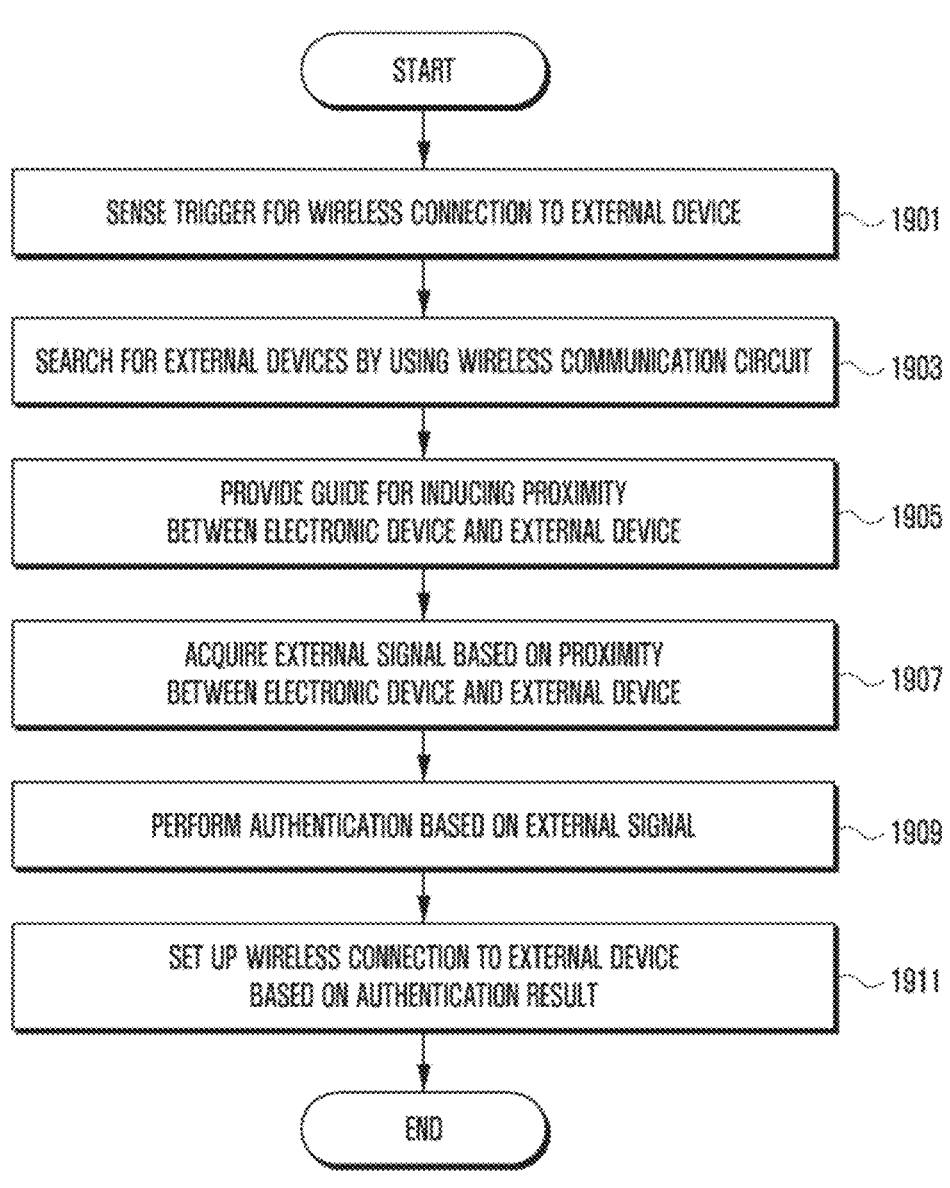
FIG. 19 is a flowchart illustrating a wireless connection operation of an electronic device according to various embodiments.

FIG. 19 is a flowchart illustrating a wireless connection operation of an electronic device according to various embodiments.

Referring to FIG. 19, in operation 1901, the processor 120 of the electronic device 101 may detect a trigger (e.g., a connection service initiation) for a wireless connection to the external device 201. According to an embodiment, the processor 120 may identify, based on various user inputs, a trigger related to the wireless connection to the external device 201. The user inputs may include, for example, execution of an application related to wireless connection configuration and/or a designated input (e.g., a touch, gesture, an air gesture, and/or a voice command).

In operation 1903, the processor 120 may search for the external device 201 by using the wireless communication circuit 320. According to an embodiment, the processor 120 may search for nearby external devices internally (or by a background operation) based on the detecting of the trigger.

In operation 1905, the processor 120 may provide, through the display 310, a guide for inducing the electronic device 101 and the external device 201 to be in proximity to each other within a designated range. According to an embodiment, through the display 310, the processor 120 may provide a user with a first user interface related to a guide (e.g., a proximity induction guide) for inducing the electronic device 101 and the external device 201 to be in proximity to each other in terms of a distance (or location). According to an embodiment, operations 1903 and 1905 may be performed sequentially, in parallel, in reverse order, or heuristically.

In operation 1907, the processor 120 may acquire an external signal (e.g., a voice signal or an inaudible frequency signal) through the microphone 370 based on the proximity between the electronic device 101 and the external device 201. According to an embodiment, the processor 120 may identify that the electronic device 101 and the external device 201 are in proximity to each other within the designated range.

According to an embodiment, the processor 120 may identify the degree of proximity within the designated range, based on the result of monitoring the degree of proximity between the electronic device 101 and the external device 201. According to an embodiment, when it is detected that the electronic device 101 and the external device 201 are in proximity to each other within the designated range, the processor 120 may perform a designated operation with the external device 201 to acquire an external signal through the microphone 370.

For example, the processor 120 may control, based on a first designated operation, the microphone 370 of the electronic device 101 to be turned on, and may instruct the external device 201 to turn on the microphone of the external device 201. According to an embodiment, the processor 120 may provide a second user interface through the display 310, based on the first designated operation. For example, the processor 120 may acquire an audio signal (e.g., a voice signal) from the user through the microphone 370, based on a guide (e.g., an audio input guide) for inducing an audio input (e.g., user voice utterance).

In another example, the processor 120 may output, based on a second designated operation, an inaudible frequency signal through the speaker 380 of the electronic device 101, and may instruct to the external device 201 to output an inaudible frequency signal corresponding to the inaudible frequency signal. According to an embodiment, the processor 120 may provide, based on the second designated operation, a third user interface through the display 310. For example, the processor 120 may provide a guide (e.g., an authentication guide) indicating that authentication is being performed with the external device 201, and, internally (or by a background operation), may acquire the inaudible frequency signal output through the speaker of the external device 201 through the microphone 370 of the electronic device 101.

In operation 1909, the processor 120 may perform, based on the acquired external signal, authentication for a wireless connection to the external device 201. According to an embodiment, the processor 120 may include authentication data in the external signal (e.g., the voice signal or the inaudible frequency signal), and may use the authentication data to check the consistency of wireless connection to the external device 201.

For example, the processor 120 may use the audio signal (e.g., the voice signal) acquired according to the first designated operation to acquire first authentication data of the electronic device 101 (e.g., first time information and/or first voice information) and second authentication data of the external device 201 (e.g., second time information and/or second voice information), and may perform security authentication related to the wireless connection, based on the first authentication data and the second authentication data.

In another example, the processor 120 may use the inaudible frequency signal acquired according to the second designated operation to acquire first authentication data of the electronic device 101 (e.g., a first authentication code) and second authentication data of the external device 201 (e.g., a second authentication code), and may perform security authentication related to the wireless connection, based on the first authentication data and the second authentication data.

In operation 1911, the processor 120 may configure, based on the authentication result, a wireless connection to the external device 201 by using the wireless communication circuit 320. According to an embodiment, when the security authentication is normally confirmed (or checked), the processor 120 may transmit a connection request to the external device 201 through the wireless communication circuit 320, and may connect the electronic device 101 and the external device 201 to each other, based on receiving a connection response from the external device 201. According to an embodiment, the processor 120 may complete the wireless connection between the electronic device 101 and the external device 201, and may transmit/receive data between the electronic device 101 and the external device 201.

As described above, an operation method performed by an electronic device 101 according to one or more embodiments of the disclosure may include detecting a trigger for a wireless connection to an external device 201, searching, based on the detecting of the trigger, for the external device 201 by using a wireless communication circuit (e.g., the wireless communication module 192 in FIG. 1 or the wireless communication circuit 320 in FIG. 3), providing, through a display (e.g., the display device 160 in FIG. 1 or the display 310 in FIG. 3), a guide for inducing the electronic device 101 and the external device 201 to be in proximity to each other in a designated range, acquiring an external signal through a microphone (e.g., the input device 150 in FIG. 1 or the microphone 370 in FIG. 3) by performing a designated operation with the external device 201 when detecting that the electronic device 101 and the external device 201 are in proximity to each other within the designated range, performing authentication for the wireless connection to the external device 201 based on the acquired external signal, and configuring, based on the authentication result, the wireless connection to the external device 201 by using the wireless communication circuit.

According to various embodiments of the disclosure, the providing of the guide may include displaying, based on the detecting of the trigger, a first user interface related to a guide for inducing proximity between devices.

According to various embodiments of the disclosure, the providing of the guide may include transmitting, based on the detecting of the trigger, a service initiation request, which instructs the external device to execute the designated operation, by using the wireless communication circuit According to various embodiments of the disclosure, the designated operation may include turning on a microphone of the external device, and the service initiation request may include address information of the electronic device, service initiation information, and/or external signal reception standby indication information.

According to various embodiments of the disclosure, the method may include monitoring the degree of proximity to the external device by using the wireless communication circuit, and identifying, based on the monitoring result, that the external device is in proximity within the designated range when the signal reception sensitivity of the electronic device and the external device reaches a designated threshold.

According to various embodiments of the disclosure, the designated operation may include displaying a second user interface related to a guide for inducing a user's audio input, based on detecting that the electronic device and the external device are in proximity to each other within the designated range, controlling a microphone related to the designated operation to be turned on with the displaying of the second user interface, and receiving an audio signal from the outside through the microphone.

According to various embodiments of the disclosure, the performing of the authentication may include acquiring first authentication data based on the audio signal, acquiring, from the external device, second authentication data acquired based on the audio signal, and performing authentication for a wireless connection between the electronic device and the external device, based on data consistency between the first authentication data and the second authentication data.

According to various embodiments of the disclosure, the performing of the authentication may include displaying, based on detecting that the electronic device and the external device are in proximity to each other within the designated range, a third user interface related to a guide indicating that authentication is being performed with the external device, controlling a speaker related to the designated operation to be turned on with the displaying of the third user interface, encoding a first authentication code in the first designated frequency signal and outputting the first designated frequency signal to the external device through the speaker, acquiring a second designated frequency signal, including a second authentication code acquired based on the first designated frequency signal, from the external device through the microphone, and performing authentication for a wireless connection between the electronic device and the external device, based on data consistency between the first authentication code and the second authentication code.

Various embodiments disclosed in the specification and the drawings are merely particular examples provided for easily describing the technical matters of the disclosure and contributing to understanding of the disclosure, and do not limit the scope of the disclosure. Therefore, it should be construed that all modifications or modified forms capable of being derived from the technical idea of the disclosure in addition to the embodiments disclosed herein are included in the scope of the disclosure.

What is claimed is:
1. An electronic device comprising:
a microphone;
communication circuitry;
a display;
at least one processor operatively connected to the microphone, the communication circuitry, and the display,
memory storing instructions that, when executed by the at least one processor, cause the electronic device to:
in response to executing an application, search for external devices by using the communication circuitry;
display information related to the searched external devices on an execution screen of the application;
in response to a touch input selecting an external device among the searched external devices, display, on the execution screen, information notifying a user to move the electronic device into proximity with the selected external device;

based on identifying that the selected external device is within a designated range from the electronic device, display, on the execution screen, a designated text and information notifying the user to utter the designated text;

receive a signal related to a user voice that utters the designated text through the microphone;

generate first authentication data based on the received signal;

prior to establishing a wireless connection with the selected external device, receive second authentication data from the selected external device, the second authentication data being generated by the selected external device based on the user voice;

prior to establishing the wireless connection with the selected external device, perform authentication for the wireless connection to the selected external device using the first authentication data and the second authentication data; and based on the authentication, establish the wireless connection with the selected external device through the communication circuitry.

2. The electronic device of claim 1, wherein the instructions, when executed by the at least one processor, cause the electronic device to:

display a first user interface related to proximity between devices; and transmit, through the communication circuitry, a service initiation request which instructs the selected external device to execute a designated operation, wherein the designated operation comprises turning on a microphone of the selected external device, and wherein the service initiation request comprises address information of the electronic device, service initiation information, and voice reception standby indication information.

3. The electronic device of claim 2, wherein the instructions, when executed by the at least one processor, cause the electronic device to:

monitor a degree of proximity to the selected external device by using the communication circuitry; and identify that the selected external device and the electronic device are within the designated range from each other based on a result of the monitoring indicating that signal reception sensitivity of the electronic device and the selected external device reaches a designated threshold.

4. The electronic device of claim 2, wherein the instructions, when executed by the at least one processor, cause the electronic device to:

based on detecting that the electronic device and the selected external device are within the designated range from each other, display a second user interface related to an audio input;

control the microphone of the electronic device to be activated with the displaying of the second user interface; and receive an audio signal through the microphone.

5. The electronic device of claim 4, wherein the instructions, when executed by the at least one processor, cause the electronic device to:

acquire the first authentication data based on the audio signal;

receive, from the selected external device, the second authentication data acquired based on the audio signal; and perform the authentication for the wireless connection between the electronic device and the selected external device, based on data consistency between the first authentication data and the second authentication data.

6. The electronic device of claim 2, wherein the electronic device comprises a speaker, and wherein the instructions, when executed by the at least one processor, cause the electronic device to output a first frequency signal to the selected external device through the speaker, based on detecting that the electronic device and the selected external device are within the designated range from each other.

7. The electronic device of claim 6, wherein the instructions, when executed by the at least one processor, cause the electronic device to:

based on detecting that the electronic device and the selected external device are within the designated range from each other, display a third user interface indicating that authentication is being performed with the selected external device;

control the speaker to be activated with the displaying of the third user interface;

encode a first authentication code in the first frequency signal and output the first frequency signal to the selected external device through the speaker;

acquire a second frequency signal from the selected external device through the microphone, the second frequency signal comprising a second authentication code acquired based on the first frequency signal; and perform the authentication for the wireless connection between the electronic device and the selected external device, based on data consistency between the first authentication code and the second authentication code.

8. The electronic device of claim 2, wherein the instructions, when executed by the at least one processor, cause the electronic device to:

search for nearby candidate external devices by using the communication circuitry;

display objects related to the electronic device and the found candidate external devices through the first user interface;

display distinguishably the candidate external devices in the first user interface, based on signal reception sensitivity of the found candidate external devices;

select a nearest candidate external device, among the candidate external devices, to be a target external device to be connected; and display objects related to the electronic device and the target external device in the first user interface, based on the selection of the target external device.

9. An operation method of an electronic device, the operation method comprising:

in response to executing an application, searching for external devices by using a communication circuitry;

displaying information related to the searched external devices on an execution screen of the application;

in response to a touch input selecting an external device among the searched external devices, displaying, on the execution screen, information notifying a user to move the electronic device into proximity with the selected external device;

based on identifying that the selected external device is within a designated range from the electronic device, displaying, on the execution screen, a designated text and information notifying the user to utter the designated text;

receiving a signal related to a user voice that utters the designated text-text through a microphone;

generating first authentication data based on the received signal;

prior to establishing a wireless connection with the selected external device, receiving second authentication data from the selected external device, the second authentication data being generated by the selected external device based on the user voice;

prior to establishing the wireless connection with the selected external device, performing authentication for the wireless connection to the selected external device using the first authentication data and the second authentication data; and based on the authentication, establishing the wireless connection with the selected external device through the communication circuitry.

10. The operation method of claim 9, wherein the displaying of the information notifying the user to move the electronic device into proximity with the selected external device comprises:

displaying a first user interface related to proximity between devices; and transmitting, through the communication circuitry, a service initiation request which instructs the selected external device to execute a designated operation, wherein the designated operation comprises activating on a microphone of the selected external device, and wherein the service initiation request comprises address information of the electronic device, service initiation information, and voice reception standby indication information.

11. The operation method of claim 10, further comprising:

monitoring a degree of proximity to the selected external device by using the communication circuitry; and identifying that the selected external device and the electronic device are within the designated range from each other based on a result of the monitoring indicating that signal reception sensitivity of the electronic device and the selected external device reaches a designated threshold.

12. The operation method of claim 10, wherein the designated operation comprises:

displaying a second user interface related to an audio input, based on detecting that the electronic device and the selected external device are within the designated range from each other;

controlling the microphone of the electronic device to be activated with the displaying of the second user interface; and receiving an audio signal through the microphone.

13. The operation method of claim 12, wherein the performing of the authentication comprises:

acquiring the first authentication data based on the audio signal;

receiving, from the selected external device, the second authentication data acquired based on the audio signal; and performing the authentication for the wireless connection between the electronic device and the selected external device, based on data consistency between the first authentication data and the second authentication data.

14. The operation method of claim 10, wherein the performing of the authentication comprises:

based on detecting that the electronic device and the selected external device are within the designated range from each other, displaying a third user interface indicating that authentication is being performed with the selected external device;

controlling a speaker of the electronic device to be turned on with the displaying of the third user interface;

encoding a first authentication code in a first frequency signal and outputting the first frequency signal to the selected external device through the speaker;

acquiring a second frequency signal from the selected external device through the microphone, the second frequency signal comprising a second authentication code acquired based on the first frequency signal; and performing the authentication for the wireless connection between the electronic device and the selected external device, based on data consistency between the first authentication code and the second authentication code.

*   *   *   *   *